US006360188B1

United States Patent
Freidman et al.

(10) Patent No.: US 6,360,188 B1
(45) Date of Patent: Mar. 19, 2002

(54) TIME-BASED MODELING

(75) Inventors: Jonathan Michael Freidman, Dunstable; Flynn Devynn Fishman, London, both of (GB)

(73) Assignee: Brixx Limited (GB)

( * ) Notice: Subject to any disclaimer, the term of this patent is extended or adjusted under 35 U.S.C. 154(b) by 0 days.

(21) Appl. No.: 09/182,101

(22) Filed: Oct. 27, 1998

(51) Int. Cl.[7] .............................................. G06F 17/50
(52) U.S. Cl. ..................... 703/1; 703/2; 703/6; 703/13; 707/503
(58) Field of Search ............................. 703/1, 2, 6, 13; 707/503; 716/11

(56) References Cited

U.S. PATENT DOCUMENTS

| | | | |
|---|---|---|---|
| 4,019,027 A | 4/1977 | Kelley ....................... 235/89 R |
| 4,263,651 A | 4/1981 | Donath et al. .................. 716/6 |
| 5,003,487 A | 3/1991 | Drumm et al. ................. 716/8 |
| 5,768,158 A | * 6/1998 | Adler et al. ................... 716/11 |
| 5,828,861 A | 10/1998 | Miyayama et al. ......... 712/268 |
| 6,138,130 A | * 10/2000 | Adler et al. ................. 707/503 |

OTHER PUBLICATIONS

Sethi, "Strategically Planning or Just Spreadsheet Programming", Management Accounting, pp. 40–41 (Sep. 1998).*

Anonymous, "Personal Analyst Software—Data That Transcend the What and Give You the Why", Management Accounting, pp. 60–61 (Nov. 1997).*

Dreyer et al, "An Object–Oriented Data Model for a Time Series Management System", IEEE Seventh International Working Conference on Scientific and Statistical Database Management, pp. 186–195 (Sep. 1994).*

Brixx, "ObjectFactory 2.1" Object Creation Guide, Jul. 30. 1998, 40 pgs.

* cited by examiner

*Primary Examiner*—Kevin J. Teska
*Assistant Examiner*—Samuel Broda
(74) *Attorney, Agent, or Firm*—Morrison & Foerster LLP

(57) ABSTRACT

A computer-implemented modeling, or planning, system provides a graphical user interface including a timeframe. Under user control, instances of component objects representing modeling entities can be displayed with respect to the timeframe for the input of time-related properties for the component objects. The component objects provide calculations in response to the time-related properties on properties of the component object for deriving an output comprising a time-series of output values. A resulting report can be generated based on the time-series of output values. The displayed instances of the component objects can be directly manipulated by the user in order to define the time-related properties. The direct graphical representation facilitates planning operations and enables accurate, rapid and easily understandable development of plans. Multiple scenarios can easily be generated using the system. A revision mechanism facilitates the return to a scenario modeled earlier.

87 Claims, 29 Drawing Sheets

Fig. 5 ss1a.apl - ObjectPlanner

File  Edit  View  Search  Reports  Timeline  Objects  Scenario  Help  Debug

More | Planning | Editing | Reporting | Graphing | Writing | Custom | Custom | Warnings | Help

| Object | Start Date | Duration | End Date | Frequency |
|---|---|---|---|---|
| Division 1 | | | | |
|   Sales | December 01, 1998 | 8 months | July 30, 1999 | Every 1 month's end |
|   Cost Sales | January 01, 1999 | 7 months | July 30, 1999 | Every 1 month's end |
|   Administration | January 01, 1999 | 7 months | July 30, 1999 | Every 1 month's end |
| Division 2 | | | | |
|   Sales | February 01, 1999 | 7 months | August 31, 1999 | Every 1 month's end |
|   Cost Sales | March 01, 1999 | 6 months | August 31, 1999 | Every 1 month's end |
|   Loan | March 01, 1999 | 6 months | August 31, 1999 | Every 1 month's end |
| | February 01, 1999 | 6 months | July 30, 1999 | Every 1 month's end |

Change | | Time

| Change | Date | Time |
|---|---|---|
| Cost of Sales's Start Date changed from Wed, Dec 30, 1998 to Fri, Jan 01, 1999 | 10/14/98 | 16:24:43 |
| Loan's Start Date changed from Mon, Mar 01, 1999 to Mon, Feb 01, 1999 | 10/14/98 | 16:24:33 |
| Loan created | 10/14/98 | 16:24:28 |
| Cost of Sales' Duration changed from 4 months to 7 months | 10/14/98 | 16:24:18 |
| Cost of Sales' Start Date changed from Thur, Mar 04, 1999 to Mon, Mar 01, 1999 | 10/14/98 | 16:24:15 |
| Cost of Sales' Duration changed from 4 months to 6 months | 10/14/98 | 16:24:11 |
| Cost of Sales' Start Date changed from Wed, Dec 30, 1998 to Fri, Jan 01, 1999 | 10/14/98 | 16:24:09 |
| Division 1's Name changed from Division 1 to Division 2 | 10/14/98 | 16:23:49 |
| Cost of Sales' Start Date changed from Fri, Jan 29, 1999 to Mon, Feb 01, 1999 | 10/14/98 | 16:23:45 |
| Division 1 pasted | 10/14/98 | 16:23:43 |
| Group's Name changed from Group to Division 1 | 10/14/98 | 16:23:34 |
| Cost of Sales' Percent of sales changed from 0.00% to 20.00% | 10/14/98 | 16:23:19 |
| Sales' Every changed from 1 month to Every 1 month's end | 10/14/98 | 16:23:11 |

My Business
INCOME FORECAST
FOR THE PERIOD ENDED Friday, September 29, 2000

| | 29-Jan-99 $ | 26-Feb-99 $ | 31-Mar-99 $ | 30-Apr-99 $ | 31-May-99 $ | 30-Jun-99 $ | 30-Jul-99 $ |
|---|---|---|---|---|---|---|---|
| REVENUE | | | | | | | |
| Division 1 Sales Sales | 300.00 | 270.00 | 243.00 | 218.70 | 196.83 | 177.15 | 159.43 |
| Division 2 Sales Sales | | | 673.49 | 1,037.50 | 1,449.95 | 2,223.97 | 3,581.72 |
| TOTAL REVENUE | $300.00 | $270.00 | $916.49 | $1,256.20 | $1,646.78 | $2,401.11 | $3,741.15 |
| COST OF GOODS AND SERVICES | | | | | | | |
| Cost of materials | 60.00 | 54.00 | 183.30 | 251.24 | 329.36 | 480.22 | 748.23 |
| Production payroll | | 2,500.00 | 2,500.00 | 2,500.00 | 2,500.00 | 2,500.00 | 2,500.00 |
| Direct costs | | | | | | | |
| TOTAL COST OF SALES | $60.00 | $2,554.00 | $2,683.30 | $2,751.24 | $2,829.36 | $2,980.22 | $3,248.23 |
| GROSS PROFIT | $240.00 | ($2,284.00) | ($1,766.81) | ($1,495.04) | ($1,182.57) | ($579.11) | $492.92 |
| TOTAL ADMINISTRATION EXPENSES | $145.00 | $145.00 | $145.00 | $145.00 | $145.00 | $145.00 | $145.00 |
| TOTAL OPERATING EXPENSES | $145.00 | $145.00 | $145.00 | $145.00 | $145.00 | $145.00 | $145.00 |
| NET INCOME | $95.00 | ($2,429.00) | ($1,911.81) | ($1,640.04) | ($1,327.57) | ($724.11) | $347.92 |
| CUMULATIVE NET INCOME | $95.00 | ($2,334.00) | ($4,245.81) | ($5,885.85) | ($7,213.43) | ($7,937.54) | ($7,589.61) |

Fig. 6

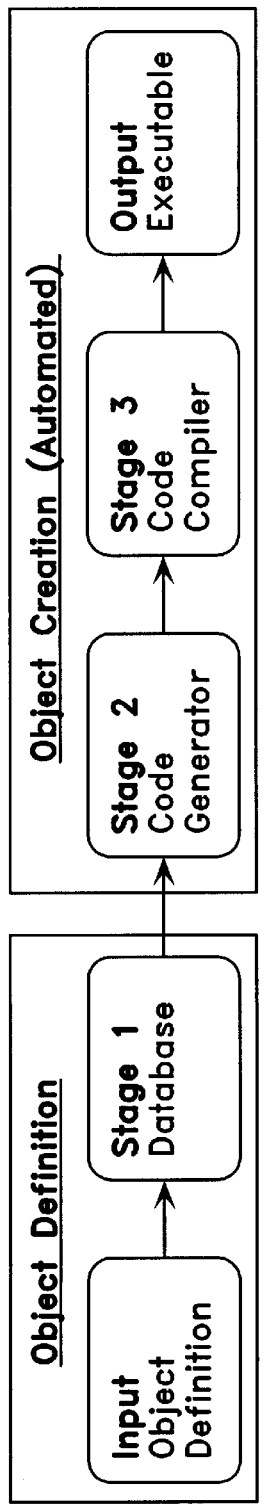

Fig. 16

Account Entry

Account Name: Trade

Caption: Sales

Description: Total Sales for all products

Rep Order: 5330    Type: Account

☑ Format as Currency
☐ Format as Percentage
☐ On reports default to account change Remember you specify the "prefix" in the relations tab and not as part of the "Account Name"

Relations | Comments | Who/When

| Account Prefix | Direction |
|---|---|
| rv | Increase |
| cf | Increase |
| ar | Increase |
| * | Increase |

| Parent | Child |
|---|---|
| arReceivable | arTrade |
| cfRevenue | cfTrade |
| rvRevenue | rvTrade |

Fig. 17

Chart of Accounts

| id | Parent ID | Child ID | Contribution Mode |
|---|---|---|---|
| 315 | acInventoryCount | acInventoryCountPurchase | Add |
| 916 | acInventoryCount | acInventoryCountSale | Add |
| 924 | acInventoryCount | acInventoryCountWriteOff | Add |
| 894 | bsLiabilityLongTerm | acPrincipleOutstanding | Add |
| 878 | acStaff | acStaffAdmin | Add |

Fig. 18

| Property ID | Order | Caption | Default | Read Only | Show |
|---|---|---|---|---|---|
| s:SalesType | 1 | Sales are in: | b) Dollars | ☐ | ☑ |
| fNumSale | 2 | Number of units | | ☐ | ☑ |
| fUnitPrice | 3 | Unit price | | ☐ | ☑ |
| fRevenueAmount | 5 | Revenue amount | | ☐ | ☑ |
| fSalesTax | 6 | Sales Tax | 0 | ☐ | ☐ |
| f:MarketingSalesType | 100 | Resulting Sales based on: | 1 | ☐ | ☐ |
| | 101 | | | ☐ | ☐ |

Name: Sales    Lookup...

Calculations | Input Details | Criteria | User Notes | Development Notes | Children Input Summary Calculations | Calculation Options Description: update the inventory on hand if this is a sale Output Account: ocInventoryCount!Sale Equation: ([szSalesType]**"a")?[=sNumSale]:0

Copy    C++ Code ☐    Print Current Object    Maintain Properties

Record: 1 of 5

Record: 39 50

| Input Summary | | | | | |
|---|---|---|---|---|---|
| Property ID | Order | Caption | Default | Read Only | Show |
| szSalesType | 1 | Sales are in: | b) Dollars | ☐ | ☑ |
| fNumSale | 2 | Number of units | | ☐ | ☑ |
| fUnitPrice | 3 | Unit Price | | ☐ | ☑ |

Fig. 18A

| Calculation | Calculation Options |

Description: update the inventory on hand if this is a sale

Output Account: acInventoryCountSale

Equation: ([`^szSalesType]=="a")?[.=fNumSale]:0

C++ Code

Record 1 of 5

Fig. 18B

| Calculation | Calculation Options |

Description: update the inventory on hand if this is a sale

Accounts effected at object
○ Beginning  ○ End
● Regular Intervals
○ Specific Date Product Segmentation: Loop Products
Disable Scope Optimization ☐
Skip Self ☐

Value is time
● Dependent
○ Independent

Record 1 of 5

Fig. 18C

TIME-BASED MODELING

BACKGROUND OF THE INVENTION

This invention relates to computer implemented modeling systems and methods for modeling time-dependent scenarios, systems and processes, and to tools for such systems and methods. The modeling may relate to planning activities for the generation of a time-based model, or plan, but could relate more generally to the generation of models for simulations, emulations, control structures, etc.

An example of a tool that can be used for modeling time-dependent situations is the well-known spreadsheet type of application for a computer system. An example of such a tool is Microsoft Excel program marketed by Microsoft Corporation. (Microsoft is a registered trademark of Microsoft Corporation). A spreadsheet is based on the concept of cells. The function of each cell in a two dimensional array of rows and columns is used to define inputs, calculations and outputs. A spreadsheet can thus be used for deriving a final report as defined by those inputs, calculations and outputs. For example, a typical application of a spreadsheet is to derive reports for financial planning. However, it can also be used for modeling the operation of, for example, a chemical process, or the operation of a complex system, for example the environmental controls of a building. In a such a case, the data to be processed in the spreadsheet need not relate to financial values, but could relate to the properties of the process, or of the environment of the building, by way of example only.

Although spreadsheets can be used for planning events that are related to time, spreadsheets are not ideally adapted for this task. This is as a result of the rigid way in which spreadsheets are defined in terms of the cells and the interaction between cells. For example, a column in a spreadsheet could be given an attribute relating to time. Individual cells in respective rows could then be given individual sets of data and calculations could be defined for the cells to produce a result that was time-related. If then, however, it were desired to investigate alternative scenarios with respect to time, it would be necessary to redefine or change the time-designation of the columns, the data in the cells and the interaction between the cells for the new scenario. The process of modifying the columns can be very complicated, requiring inordinate care to ensure that the designations of the respective cells correctly reflect the intended relationships. Indeed, in normal operation of a spreadsheet it is all too easy to damage a model. It can be seen, therefore, that a spreadsheet is not an ideal tool for planning.

Users of spreadsheets will be aware that using spreadsheets for planning can rapidly become very unwieldy due to the multiplicity of spreadsheets that may need to be generated, and the difficulty in relating one spreadsheet to another. There is, moreover, the difficulty of ensuring that the individual spreadsheets are accurate, due to the fact that a single error in a single cell, in a single column or row, can cause the generated results to be wrong. With a large number of cells and complex interactions between the cells, it can be very difficult indeed to ensure that all the entries in, and definitions of, the cells are correct. The difficulty in verifying the accuracy and correctness of the spreadsheet is at least partially a result of the row and column format of a spreadsheet, which is not intuitive.

A further difficulty with the operation of spreadsheets is the need to define a time-granularity for the calculations. If it is desired to model the same events on a different time-granularity, it will then be necessary completely to redefine the spreadsheet (effectively starting again from the beginning). In this, it is also to be noted that there is normally an upper limit to the number of columns in the spreadsheet. Accordingly, for a given granularity in time, only a relatively limited number of time periods can be modeled.

Critical path analysis techniques have been employed for the generation of time-based plans. Various specialist tools can be employed to carry out a critical path analysis, but they tend to be very complex and to require the knowledge of specially trained operators.

Planning tools are known that enable a graphical representation of planning activities and the relationship between activities to be planned. An example of such a tool is Microsoft Project, marketed by Microsoft Corporation. However, such planning tools effectively provide a computer-based alternative to the conventional wall charts that have been, and are still, used for planning purposes. Typically, they will not be used in isolation, but rather in combination with a spreadsheet to provide a full analysis of a plan. As a result, conventional planning tools of this type do not provide a solution to the problems described above.

Accordingly, an object of the present invention is to provide a modeling, or planning tool and a method and system incorporating such a tool that avoids, or at least mitigates, the problems associated with prior art approaches to planning and modeling in a computer system.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with one aspect of the invention, there is provided a computer-implemented modeling system. A graphical user interface mechanism is configured to display a timeframe on a computer display medium. The graphical user interface mechanism is further configured selectively to display under user control, a representation of a selectable instance of at least one component object for a modeled entity. The representation of that component object instance as displayed with respect to the timeframe represents time-related properties for the component object instance. The component object includes a calculating engine defining the functionality of the modeled entity. The calculating engine is configured to respond to the time-related properties for the selected component object instance to perform calculations on at least one component object property for deriving an output comprising a time-series of output values. A result mechanism derives at least one result value based on the time-series of output values derived by the selected component object instance.

The invention employs a combination of a graphical user interface to define time-related properties, or parameters, of an object for a modeling entity in combination with an object including a computing engine (for example code or methods for implementing a process) which defines the functionality of the modeling entity and produces a time-series of output values in response to the time related properties. An embodiment of the invention is not merely a replacement for a conventional spreadsheet or planning tool, but rather employs a new and innovative approach to performing tasks previously performed by such tools, but without the disadvantages of those tools.

Hierarchical relationships can be established between component objects by means of properties defining links between the component objects. A plurality of user selectable object types can be provided, with each object type being for a respective modeling entity type and comprising a calculating engine defining a functionality specific to the respective modeling entity type. Examples of entity types are for a business group, a sales unit, an administration units, etc. in a financial or business planning application. In another application, for example for modeling the environmental controls of a building, they could relate to fuel supply, user occupancy unit, lighting, heating, air-conditioning, insulation, and other parameters of the overall system.

In a preferred embodiment of the invention, the displayed instance of a component object can be directly manipulated by the user in order to define the time-related properties. Alternatively, or in addition, the display of the instance of the object can be derived in response to separate input of time-related properties, for example by means of user entry of those properties in a data entry field.

Irrespective of the user definition of the instance of the object with respect to the timeframe, the representation of that instance of the object with respect to the timeframe facilitates the appreciation of the time-relationship of and the interdependency between component objects. Accordingly, more reliable entry of the time-related properties of a component object is possible than with a prior art approach.

The component object is automatically responsive to the input of the time-related properties, as represented by the display of the instance of the object with respect to the timeframe, to conduct calculations on properties of the component object for automatically generating an output as a time-series of the output values. This manner of input is particularly advantageous where, during derivation of the model, the lifespan and/or granularity of the time-related properties is/are changed, for example to investigate alternative scenarios.

The instance of a component object with respect to the timeframe can represent a lifespan with a start time and an end time for the component object and/or the granularity of the component object. In a preferred embodiment of the invention, the displayed instance of the component object with respect to the timeframe represents calculation datum points for respective output values of the time-series of output values for the component object. The time-series of output values includes at least one value associated with a timing derived from the relationship between the displayed object representation and the timeframe. In this manner, the visual representation can clearly indicate to the user the points in time for which output values in the time-series of output values is to be generated. Consequently, the accurate input of datum points is facilitated.

In a presently preferred embodiment of the invention, the timeframe defines a timeline indicating time values (e.g. dates or timing offsets). The timeline extends in a first direction (e.g., a row direction) with a plurality of spaced object lines parallel to the timeline. One or more displayed instances of the object may be defined in one or more object lines with the alignment of extremities of the component object(s) with respect to the timeline representing the start and end times for the component object(s).

Overlapping of the displayed instances of component objects within an object line can be prevented in order to preserve a desired time order for those component objects.

Parent-child relationships can be derived between instances of component objects on respective object lines. In this manner a hierarchy of objects can be defined for modeling a scenario. The component objects contain links to other component objects for defining the relationship between component objects for one object line and/or for parent-child relationships.

The displayed representation could take alternative forms. For example, in a preferred embodiment of the invention a displayed instance of a component object is in the form of a bar, optionally with markers for the calculation datum points. Alternatively, the displayed representation could be in the form of a series of markers for the calculation datum points, with the markers being joined to represent the lifespan of a component object.

One object can provide the time-series of values, or a set of objects can each provide one or more of values of the time-series of output values.

A parent component object is preferably arranged to hold properties of any component object that is a child thereof. The child is then able to access properties from the parent. The properties can actually be stored in the parent object, or could alternatively be defined by a link within the object to properties held outside the object. In this manner, a component object can be responsive to a request for output from the result mechanism to obtain, from its parent object, properties for calculating an output comprising the time-series of output values, the output values being determined at the datum points defined by the time-related properties for the component object.

A root object can be defined, with the user-defined hierarchy of component objects being dependent therefrom, for modeling a scenario. The graphical user interface mechanism can be responsive to the root object and the defined series of the inter-object relationships to display a representation of the hierarchy of component objects. The links between objects can be displayed between respective displayed instances of the component objects. Selective expansion, or contraction, of displayed sub-hierarchies of component object instances can be provided. Also, a displayed instance of a component object may be selectively enabled and disabled. Optionally, the selective expansion, or contraction, of displayed sub-hierarchies of component object instances can also be provided.

To facilitate the selection of object types by the user, the graphical user interface can be configured to display a plurality of predefined object types selectable by the user for positioning with respect to the timeframe, the displayed object types automatically adopting a time-based representation with respect to the timeframe on being superimposed on the timeframe. The graphical user interface can also be configured to display an input field for inputting properties of a component object. The representation displayed for an object can be arranged to reflect the state of that object, as to whether it is in an enabled, disabled, selected, error, or other state.

A model may be formed of a plurality of component models, each component model comprising one or more component objects. A property may be in the form of an array of values. Also, a property may be sub-divided into sub-properties.

Where reference is made to the properties of a component object, these can include one or more of the following (by way of examples only): a value; an array of values; a time-series of values; a state; a Boolean; a string; a timing; a duration; a link; a bit map; or a binary stream.

The graphical user interface can be configured to display a plurality of icons corresponding to user selectable component object types. Each component object type can be for respective modeling entity type and can comprise a calculating engine defining a functionality specific to the respective modeling entity type. The icons can be selectable by a user for positioning a representation of a component object instance with respect to the timeframe. The graphical user interface can also be configured to display a data field for inputting properties of a component object.

In a preferred embodiment of the invention, the result mechanism is operable to generate a report, for example a financial report, including at least one time-series of output values. The report can be displayed on the display medium, printed on a printer, stored in memory, or exported, as required. In another embodiment, the result mechanism could, however, be arranged to provide at least one control value for controlling the operation of a modeled system.

The modeling system can be operable to model alternative scenarios as part of a single model. For example, a component object can be configured to record respective properties for plural scenarios.

In accordance with another aspect of the invention, there is provided a revision mechanism. The revision mechanism records revisions of the model including the definition of a hierarchy of revision entries, each revision entry including pointers to adjoining entries in the hierarchy and including a definition of a previous value of a property and an current value of a property. In responsive to selection of a revision of the model of the scenario, the revision mechanism is able to access the linked series of revision entries selectively to remove and to reintroduce the selected revision for the current version of the model. The revision system provides a very flexible and reliable way of deactivating and reactivating changes to investigate different combinations of properties.

In accordance with another aspect of the invention, there is provided a computer system comprising a processor, storage, a display device, at least one user input device and a program-implemented modeling tool. The modeling tool comprises a graphical user interface mechanism configured to display a timeframe on a computer display medium. The graphical user interface mechanism is also configured selectively to display, under user control, a representation of a selectable instance of at least one component object for a modeled entity. The representation of that component object instance as displayed with respect to the timeframe represents time-related properties for the component object instance. The component object includes a calculating engine defining the functionality of the modeled entity. The calculating engine is configured to respond to the time-related properties for the selected component object instance to perform calculations on at least one component object property for deriving an output comprising a time-series of output values. A result mechanism is operable to derive at least one result value based on the time-series of output values derived by the selected component object instance.

In accordance with a further aspect of the invention, there is provided a carrier medium carrying a computer program-implemented modeling tool. The modeling tool comprises graphical user interface instructions configured to display a timeframe on a computer display medium. The graphical user interface instructions are further configured selectively to display, under user control, a representation of a selectable instance of at least one component object for a modeled entity. The representation of that component object instance as displayed with respect to the timeframe represents time-related properties for the component object instance. Component object definition instructions define the component object for a modeled entity. The component object comprises a calculating engine defining the functionality of the modeled entity. The calculating engine is configured to respond to the time-related properties for the selected component object instance to perform calculations on at least one component object property for deriving an output comprising a time-series of output values. Result generation instructions are configured to derive at least one result value based on the time-series of output values derived by the selected component object instance.

The carrier medium can be computer readable storage medium, for example a magnetic, optical, magneto-optical or any other form of computer readable storage medium. Alternatively, it could comprise a telecommunications transmission medium such as an electrical, optical or electromagnetic communications medium.

In accordance with another aspect of the invention, a computer-implemented planning system comprises a plurality of selectable object types. Each object type defines a type of planning entity and includes a calculating engine for defining the functionality of the planning entity. At least a selected one of the object types includes definitions of time dependent properties and a calculating engine operable to perform time-dependent operations in response to property values for the time-dependent properties. A control mechanism defines an object hierarchy in response to user input, which user input includes specifications of property values for the time dependent properties. The control mechanism generates outputs in the form of time-series of values in response to calculations performed by the calculating engines of the objects.

The invention also provides carrier medium carrying an object definition for a computer-implemented planning system. The object defines the functionality of a planning entity. It includes a definition of a time dependent property and a definition of time-dependent operations configured to respond to input property values for the time-dependent properties to produce a time-series of output values.

In accordance with a further aspect of the invention, there is provided a computer-implemented modeling method. The method includes:
  displaying a timeframe on a computer display medium;
  displaying, under user control, a representation of a selectable instance of at least one component object for a modeled entity, the representation of that component object instance as displayed with respect to the timeframe representing time-related properties for the component object instance;
  causing the component object to be responsive to the time-related properties for the component object instance to perform calculations for the modeled entity on component object properties for deriving an output comprising a time-series of output values; and
  producing at least one result value based on the time-series of output values derived by at least one component object.

An embodiment of the invention provides a flexible and powerful planning and modeling tool that is easily understood by users without needing extensive training. It enables the generation of multiple reports in an easy and efficient manner, enabling the user to investigate changes to the model or plan and directly to be able to see the results of those changes. It greatly enhances a modeling or planning process, saving costs and producing better results than with conventional tools.

BRIEF DESCRIPTION OF THE DRAWINGS

Exemplary embodiments of the present invention will be described hereinafter, by way of example only, with reference to the accompanying drawings in which like reference signs relate to like elements and in which:

FIG. 5 illustrates a revision list of an embodiment of the invention;

FIG. 6 is a report screen of an embodiment of the present invention;

FIG. 14 provides an overview of the generation of an object;

FIG. 15 represents a property entry window;

FIG. 16 represents an account entry window;

FIG. 17 represents a chart defining a hierarchy of accounts;

FIGS. 18 to 18C illustrate an object entry window;

DESCRIPTION OF THE PREFERRED EMBODIMENTS

Figure 1:
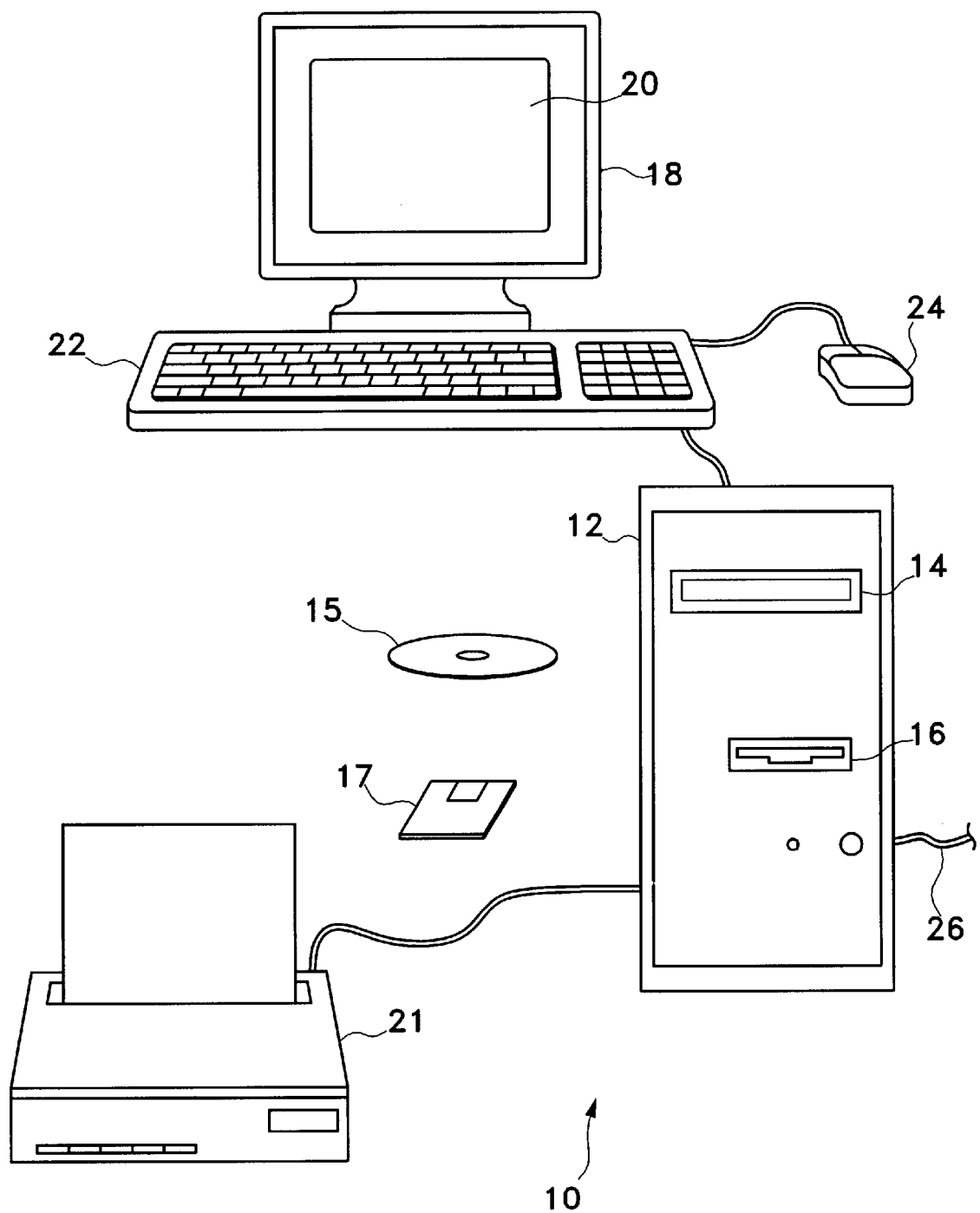
FIG. 1 represents a computer system incorporating the present invention.

FIG. 1 is a schematic representation of a computer system 10 in which the present invention may be implemented. As shown in FIG. 1, the computer system 10 comprises a system unit 12, a display device 18 with a display screen 20, and user input devices, including a keyboard 22 and a mouse 24. A printer 21 is also connected to the system. The system unit 12 comprises media drives, including and an optical disc drive 14 and a floppy disk drive 16. A CD ROM 15 and a floppy disk 17 are also illustrated. A program for implementing the invention may be supplied on a media such as one or more CD ROMs and/or floppy disks. Also shown on FIG. 1 is a connection 26 to a network, for example to a local or wide area network and/or the Internet. A program for implementing the present invention could also be supplied on a telecommunication medium, such as, for example over a telecommunications line from a network and/or the Internet.

Figure 2:
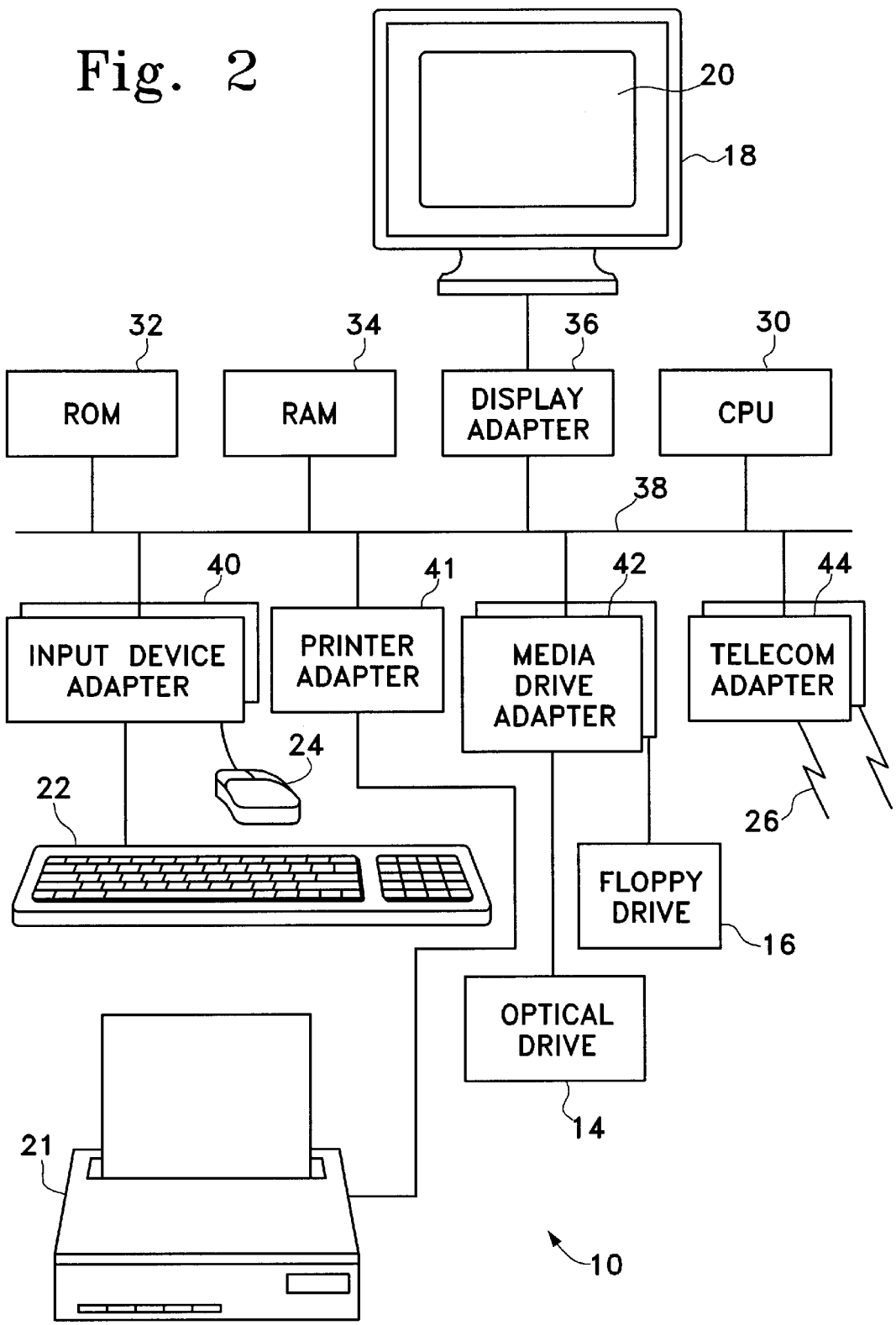
FIG. 2 is a block diagram illustrating components of the system of FIG. 1.

FIG. 2 is a schematic and simplified representation of an exemplary implementation of a computer system such as that shown in FIG. 1. As shown in FIG. 2, a processor (CPU) 30 is connected to a bus structure 38. Also connected to the bus structure 38, are read only memory 32 and random access memory 34. A display adapter 36 connects the display device 18 to the bus structure 38. One or more user input device adapters 40 connect the user-input devices, including the keyboard 22 and the mouse 24, to the bus structure 38. An adapter 41 for the connection of the printer 21 may also be provided. One or more media drive adapters 42 can be provided for connecting the media drives, for example the optical disk drive 14 and the floppy disc drive 16, to the bus structure 38. One or more telecommunications adapters 44 can be provided for connecting the computer system to one or more networks. The communications adapters 44 could include a local area network adapter, a modem, and/or an ISDN terminal adapter, etc., as required.

It will be appreciated that FIGS. 1 and 2 are schematic representations of one possible implementation of a computer system. It will be appreciated, from the following description of an embodiment of the invention, that a computer system in which the invention could be implemented may take many different forms. For example, rather than being implemented in a stand-alone workstation as illustrated in FIGS. 1 and 2, the invention may, for example, be implemented in another form of computer system. Such a computer system could, for example, comprising a computer server connected to one or more client stations via a local area or other form of network, for example via an intranet or over the Internet.

Before describing details of the implementation of the present invention in a computer system as shown in FIGS. 1 and 2, various aspects of the present invention will be described with reference to FIGS. 3–7, which illustrate screen shots from a presently preferred implementation of the invention.

Figure 3:
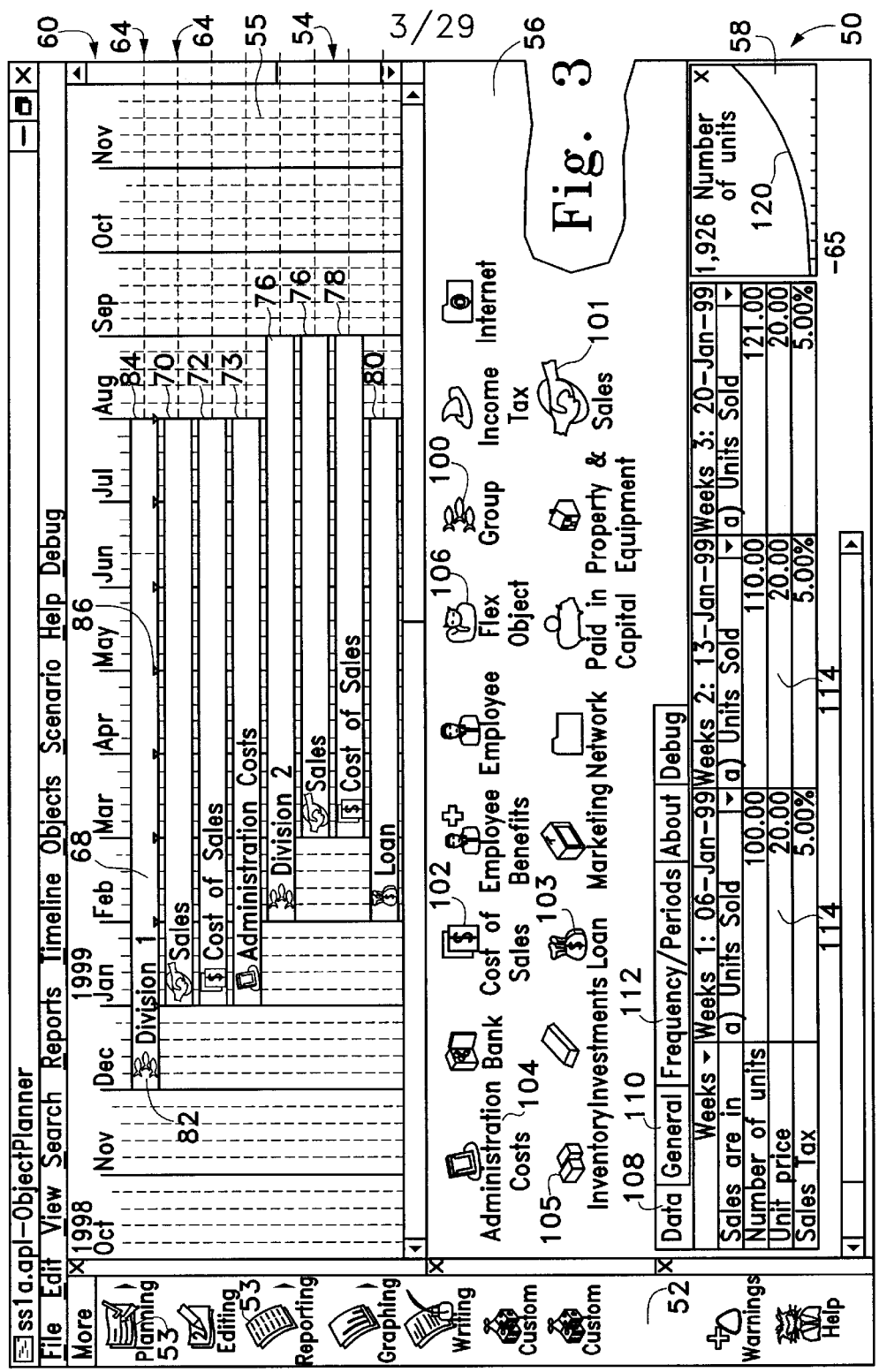
FIG. 3 illustrates a planning screen of an embodiment of the present invention.

FIG. 3 illustrates a screenshot for a planning view. This comprises four basic fields. A view selection field 52 comprises icons 53, representative of different views that can be selected. This first area is present in all views. Selecting one of the icons 53 enables the display of a corresponding view.

For the planning view, a second field forms a timeframe field 54. This includes the display of a timeframe 55, which will be described in more detail in the following. A third, object selection, field 56 displays a plurality of selectable objects (e.g., 100, 102, 104, 106). These will also be described in more detail below. A fourth, data field 58 enables the input and the display of properties of selectable instances of objects displayed in the timeframe field 54.

To illustrate the operation of an exemplary embodiment of the invention, a simple planning operation will be illustrated with reference to FIG. 3. Assume a scenario in which it is desired to start a new division of a company for sales of a particular type. It may also be desired to terminate the operation of a first division of that company. Although an example of operation relating to business planning is described in the following, it will be appreciated that the invention can equally be used for planning all sorts of different activities, scenarios, and systems, including the control of technical processes and systems.

The object selection field 56 contains icons for a number of different types of objects. Each of these object types is designed to perform a specific task. Each object includes a calculating engine (e.g., suitable methods, or code) for performing the appropriate calculations needed for the operations represented by the object concerned. Thus, for example, a Loan object 103 contains the necessary code for calculating a loan according to specified parameters, or properties, including the start and finish dates, the interest rate(s) and the times at which interest is charged and/or repayments are made. As will be described in the following, the time-related properties can be freely set in an embodiment of the invention, using the timeframe field 54.

In the present example, a simple, hypothetical, planning operation is described for illustrative purposes only. It will be appreciated that in practice the present invention can be used for much more complex planning tasks, and not merely for financial planning tasks. In this simple example, various types of objects are used. A Group object 100 defines the characteristics of a group of the company. A Sales object 101 defines the characteristics of sales for a product. A Cost of Sales object 102 determines cost factors associated with the sale of the product. A Loan object 103 defines characteristics necessary for determining the financial implications of a loan and an Administration object 104 models administration costs and. Icons for these objects are held in the object selection field 56.

To start planning, a group object 100 is selected using the mouse 24. The group object can be selected by clicking or dragged the object to the timeframe field 54 where it is superimposed on the timeframe 55. The group object includes a calculating engine (i.e. code segments, or methods) for defining the characteristics of a group of the company. The selected object automatically expands to form an instance 68 of that object from a start time 82 until an end time 84 (i.e. for defining the duration, or lifespan, of the object).

In an embodiment of the invention a default extent of the object is displayed, which can then be manipulated using conventional graphical user interface operations (e.g., using the mouse) to size and position the instance of the object with respect to the timeframe 55. Thus, the start time 82 and end time 84 can be adjusted, as required, in order that the instance of the object extends from the desired start time to the desired end time. The start and end times can also be changed by using an entry box (not shown) selectable by means of the "General" tab 110 in the data field 58.

The start and end times are automatically provided to the object's calculating engine for performing the necessary calculations. The object itself also contains a default definition of the timings at which the calculations are to be performed (e.g., at each month end). In order that the user can readily be appraised of this, these timings are optionally indicated to the user by the markings 86 shown on the bar-like representation of the object instance 68. The user may change those timings by moving the markers within the representation of the object instance 68 on the timeframe (using conventional mouse operations), or using an entry box (not shown) selectable by means of the "General" tab 110 in the data field 58.

It will be noted that the instance 68 of the group object 100 shows a name "Division 1". This name can be entered using an entry box (not shown) selectable by means of the "General tab" 110 in the data field 58. The cursor can be caused to jump to this field when an object instance is expanded on the timeframe 55 for the first time. On entry of the name "Division 1", this is then displayed within representation of the object instance 68 in the timeframe field 54. Other properties of the "Division 1" object can be entered using entry boxes 114 under the "Data" tab 108 in the data field 58 (It should be noted that the entry boxes shown in FIG. 3 relate to the Sales object 70 for the Division 1 object 68, to be described below).

It will be noted that the timeframe 55 comprises a timeline 60, which extends linearly (here in the row direction) and sets out the times for the timeline. In the present example, the timeline extends for several months starting from October 1998 and extending to January 2000. The scale of the timeline 60 can be freely changed to expand, or contract, the representation of the timeline. Thus, for example, a period of days could be shown, or a period of several years could be shown, as desired. In the present implementation of the invention, timings to a granularity of one a day may be input and displayed. However, in other implementations the granularity could be much smaller and could define hours, minutes, seconds, microseconds, etc., or much larger and could define centuries, millennia, etc., as required, in order to model a desired system or a set of activities.

Once the properties have been selected for the Division 1 object 68, a Sales object is selected to define the sales for Division 1. Accordingly, a Sales object 102 is selected and is dragged so that it overlies the Division 1 object instance 68. This operation enables this instance of a Sales object to be a child with respect to the Division 1 object instance. The instance 70 of the Sales object can then be dropped down below the Division 1 object instance 68 and a relation line 88 is displayed connecting the Division 1 object instance 68 to the sales object instance 70 to specify that the latter is a child of the former. The cursor can be arranged to jump to an entry box under the "General" tab 100 where the name for the sales object (in the present instance simply "Sales") can be entered. The duration of the instance 70 of the Sales object can be defined by adjusting the leading and trailing edges off that object. Properties of the Sales object instance 70 can be entered by means of entry boxes under the data tab 108.

It will be noted that the instance 70 of the Sales object is on a row separate from that of the Division 1 instance 68 of the group object. Each of the rows forms an object line 64 within which one or more representations of object instances made be displayed. Where the lifespans of objects may overlap and/or there is a parent-child relationship between the objects, then each of the object instances it will be displayed on a separate object line. Where, however, it is desired that the lifespan of objects should not overlap, then separate object instances may be displayed on a single object line.

A similar process to that described above for establishing the Sales object instance 70, may be employed for establishing a Cost of Sales object instance 72. It will be noted that the Cost of Sales object instance is defined as a child of the Division 1 object instance 68, rather than as a child of the Sales object 70. As will be described later, the Division 1 object 68 holds the properties and/or accounts (to be explained later) of the Sales object 70 and the Cost of Sales object 72.

Likewise, a similar process to that described above for establishing the Sales object instance 70, may be employed for establishing an Administration object instance 73. This is also defined as a child of the Division 1 object instance.

A similar process is then employed for establishing a Division 2 object instance 74, with an associated sales object instance 76 and an associated Cost of Sales object instance 78. It will be noted that the lifespans of the Division 2 object instance 74 and its children 76 and 78 are different from those of the Division 1 object instance 68 and its children 70 and 72. It will further be noticed that a Loan object instance 80 is established as a child of the Division 2 object instance 74. This Loan object instance models the cost of a loan for establishing Division 2 of the company. The data field of FIG. 3 shows the expected revenue amounts 114 which have been entered as properties for the sales of Division 2. A graph showing the expected sales is also displayed at 120 in the data field 58. A similar data field for the Loan object instance 80 could show the repayment amounts for a loan for establishing Division 2 of the company and a corresponding graphical representation. As well as showing inputs, it could show process and outputs.

The time-related properties for the model are derivable directly from the representation of the object instances within the timeframe 55. These time-related properties correspond to the timeline value on the timeline 60 along the line orthogonal to the direction of the timeline 60 and the object lines 64 (i.e. they correspond to the vertical correspondence between the ends 82/84 of the bars and/or the markers 86 and the values displayed on the timeline 60 in the present example. These time-related properties are derived from values used to generate the displayed image by the graphical user interface in accordance with conventional techniques. These values are, used, in an embodiment of the invention, as input properties for the calculating engines of the objects concerned. The objects are, accordingly, responsive to the values determining the display of the relevant object instance representations to take those input values as the time-related input properties.

Various scenarios for the timing of the establishment of Division 2 and/or the timing of the loan and/or the predictions for sales for Division 1 and Division 2 can readily be established by simply moving the boundaries of the object instances within the timeframe 55 and/or by modifying the properties are presented within the data field 58. The resulting changes cause changes to the values for generating the displayed image and are used by the calculating engine to modify the timings of calculations for generating the tie series of output values dependent thereon.

Also, the properties can readily be changes within the data field 58, for example by changing the numerical values of the properties in the entry boxes, or by manipulating a graphical representation 120 of those properties using the mouse (e.g. by pinning values within that graphical representation).

The effects of the changes introduced by varying the properties can be viewed directly and in real time through means of a report screen as will be described later with reference to FIG. 6.

Figure 4:
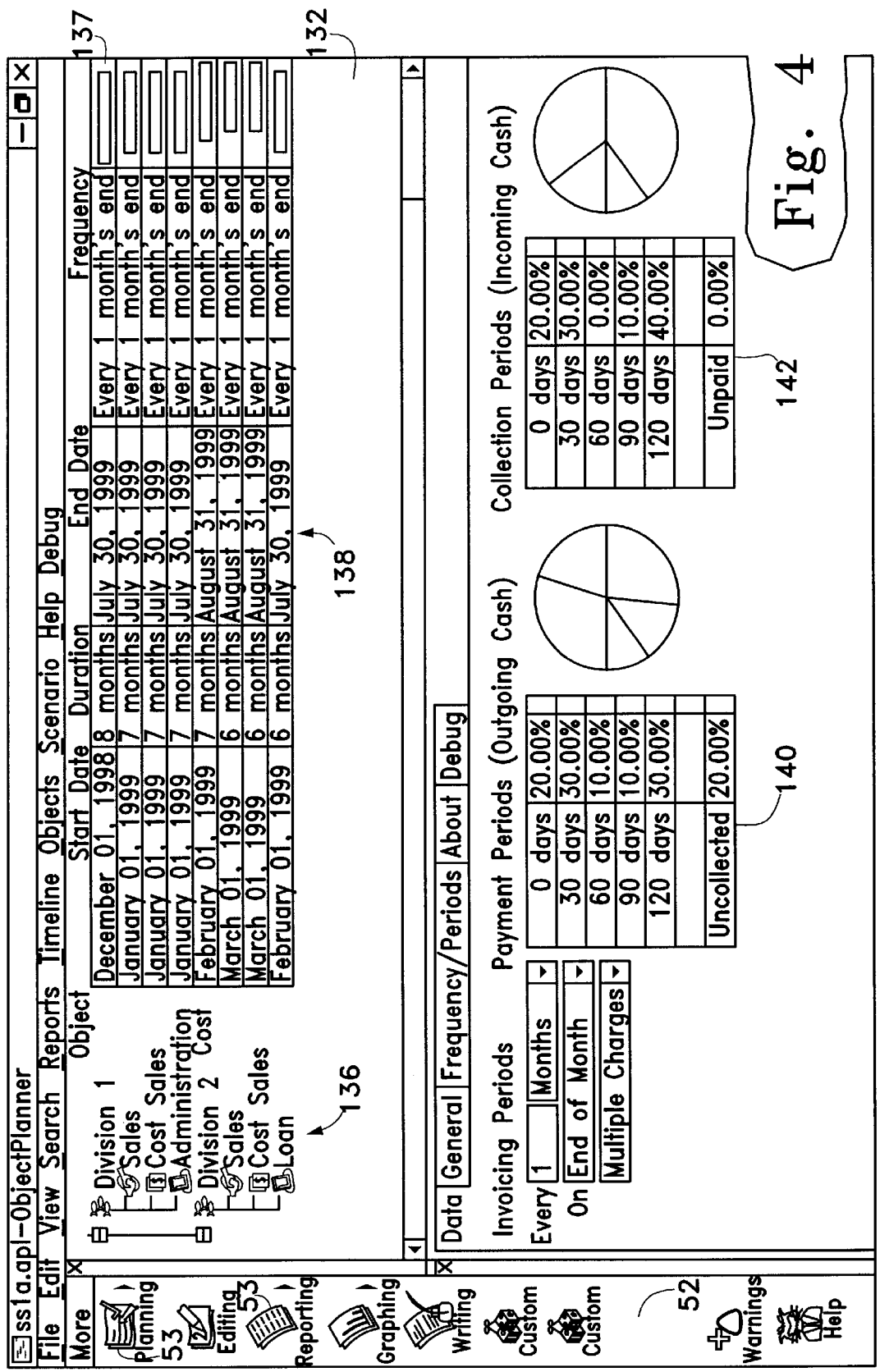
FIG. 4 illustrates a screen showing an alternative representation of the information illustrated in the screen of FIG. 3.

Before referring to FIG. 6, however, reference is made to FIGS. 4 and 5. The screen shown in FIG. 4 gives an alternative representation of the information displayed in FIG. 3. This shows the hierarchy of the object instances by means of a tree-like structure 136 within a first field 132. Also shown within the first field 132 is a tabular representation 138 of the individual object instances showing the start date, duration, end date, and frequency of the object instances, as well as a representation 137 of the relative lifespans of the object instances. Various representations of properties 140 and 142 (here payment and collection periods for the sales of Division 2) of the object instances can be displayed within a second field 134.

FIG. 5 illustrates the display of a revision list 139. The revision list shows all changes made to the plan and indicates in the left hand column whether the revision is currently active, or not in the current model. If a revision, illustrated by a given line in the table is active, the box in the left-hand column will be checked. If it is not active, then the box will not be checked. A revision can be removed from the model by selecting the line concerned and removing the check from the box. As a result any consequential changes are automatically made by the system. Likewise, a revision currently not active can be reactivated by selecting the appropriate revision line, whereby the revision concerned and any consequential revision changes will be effected automatically.

Where an object is deactivated, it still remains in the model, but the calculating engine is effectively turned off s that it has not effect on the final result. As a consequence of this it is a simple matter to re-activate the object so that the object can once more contribute to the overall result.

The displayed representations of the component objects can be arranged automatically to change their representation (e.g., by changing a displayed color or shade) according to the current state of the object (e.g., selected/non-selected, active, non-active, etc.) For example, it will be noted in FIG. 3 that the displayed object instance 70, which forms the item selected in FIG. 3, is displayed darker than the other object instances in that Figure.

Different representations of the objects are possible. Rather than a bar, a series of linked markers could be used, for example. Also rather than positively specifying an area for the object, at least for some objects the representation could be in the form of a mask that deselects everything apart from an area of interest, or alternatively deselects an area of interest.

FIG. 6 illustrates a report 150, here a financial report, which could be selected by means of the reporting icon 53 in the view selection field 52 of FIG. 3. This report provides data relating to do the calculations performed by the objects of FIG. 3 in the form of a time-series of output values. Such a time a series of output values corresponds to an output which could, in principle, be generated from a spreadsheet. However, it will be appreciated from the above description that the method of generating such a report is much more straightforward and much more understandable to a user that that which would be required using a spreadsheet. Moreover, as a result of the ease with which input parameters and properties of the objects may be changed, the effects of changing those properties can be viewed readily and in a user-friendly and understandable manner. Through the use of the view selection icons 53, it is possible to switch readily between the planning and report views to make changes and then to view the results of those changes. Also, through the use of a persistent revision mechanism to be described later, it is possible selectively to deactivate and to reactivate any desired revision in a series of revisions. It also possible with one basic model formed by the hierarchy of objects, to model many different scenarios and to compare those scenarios.

As has been mentioned above, different types of objects, or object classes, can be provided, with each object type representing a different type of modeled, or planning entity, which can be used to build a model, or plan. The modeled entities, fall into different types or classes of elements which can be used to model the system in any particular application. In the business related application specifically described herein, they relate to elements such as the business units (e.g. a group), sales, cost of sales, loan, administration cost and other elements. In another application, for example for modeling the environment of a building, they could relate to factors such as fuel supply, heating, lighting, air-conditioning, user occupancy and other such elements as appropriate to the application concerned.

Each of the object types has method or procedures (the calculating engine) configured to define the functionality of the object. The object also contains definitions of the properties needed for the calculations and data for those property definitions. At least some of these properties relate to time-related properties defining timings for effecting the calculations to give the time-series of one or more output values. Examples of such objects are represented in FIGS. 7A to 7E.

Figure 7A:
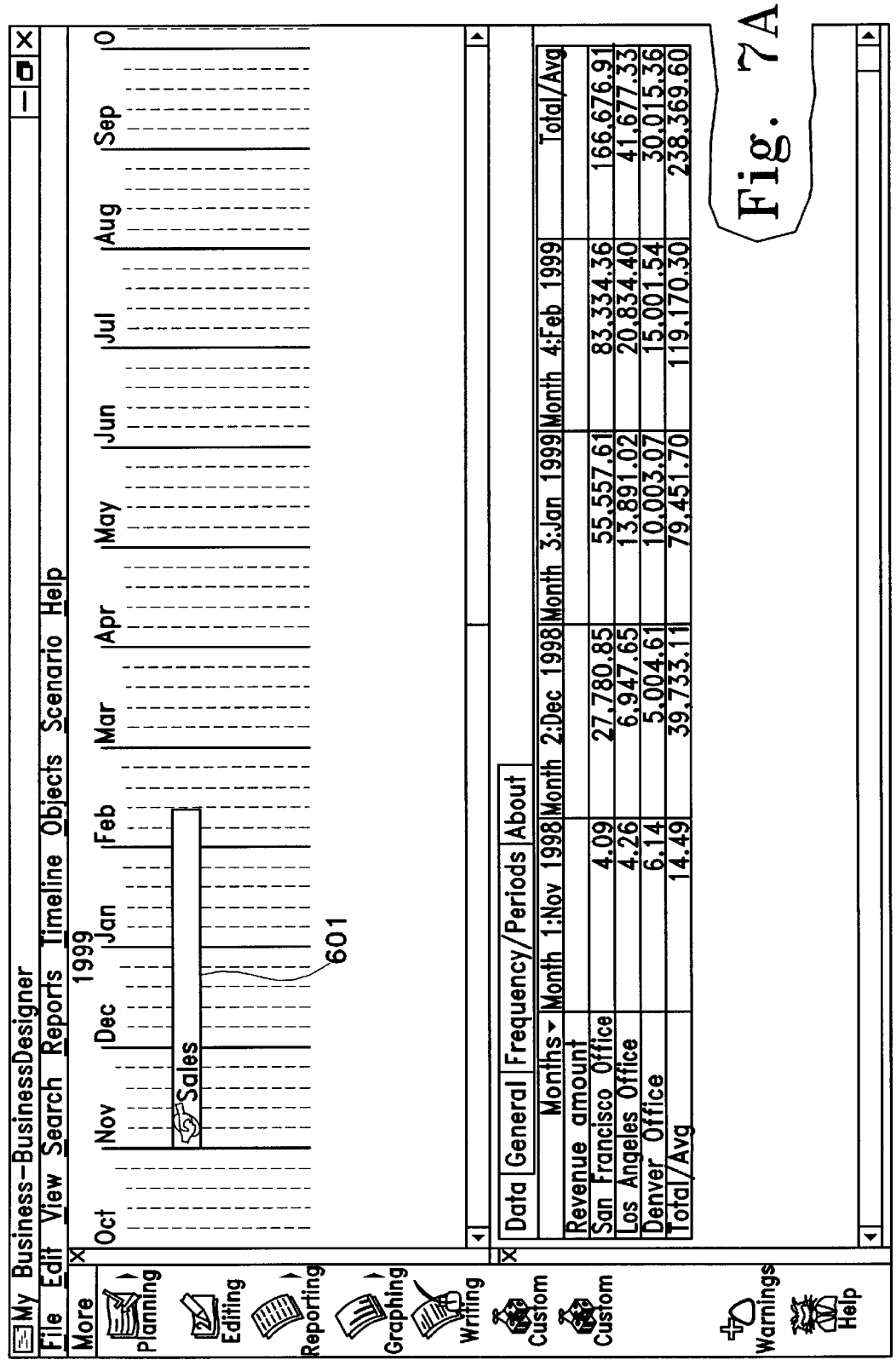
FIGS. 7A, 7B, 7C, 7D and 7E are representations of examples of different component objects.

FIG. 7A illustrates a displayed instance 601 of a Sales object 101 and properties entered in entry boxes under the "Data" tab. The properties of an object may be divided in sub-properties, with the sum of the sub-properties forming the complete property. This is illustrated, by way of example, in FIG. 7A where a property (revenue amount) is sub-divided into revenue accounts for a number of individual offices. It will also be seen that the property can be in the form of an array of values (here two-dimensional), with time being one dimension in the present instance. A sales object type can be used to model the income received from sales. The entry of only simple properties is required, such as a number of items sold (for example, per month) the sale price of each item, and a period over which the sales performances is to be monitored, as represented by the positioning of the corresponding object instance on the timeline.

Figure 7B:
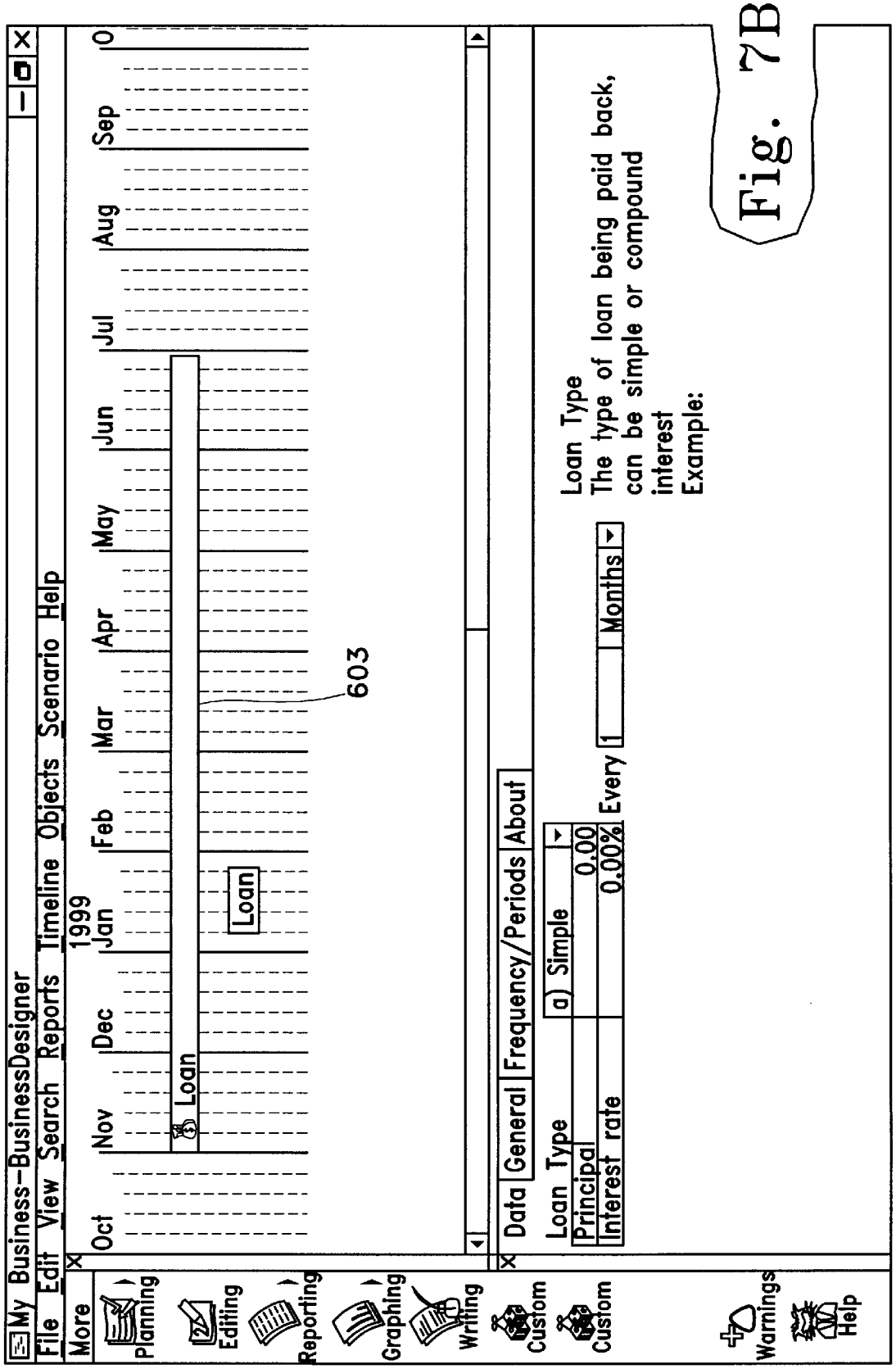

FIG. 7B illustrates a displayed instance 603 of a Loan object 103 and the entry boxes under the "Data" tab which are awaiting entry of the relevant property information. It will be noted that a default interest rate period of 1 month is provided. A Loan object type can be used to provide appropriate loan calculations requiring simple properties to be defined such as an amount of a loan, an interest rate, and the term of the loan as represented by the positioning of the corresponding object instance on the timeline.

Figure 7C:
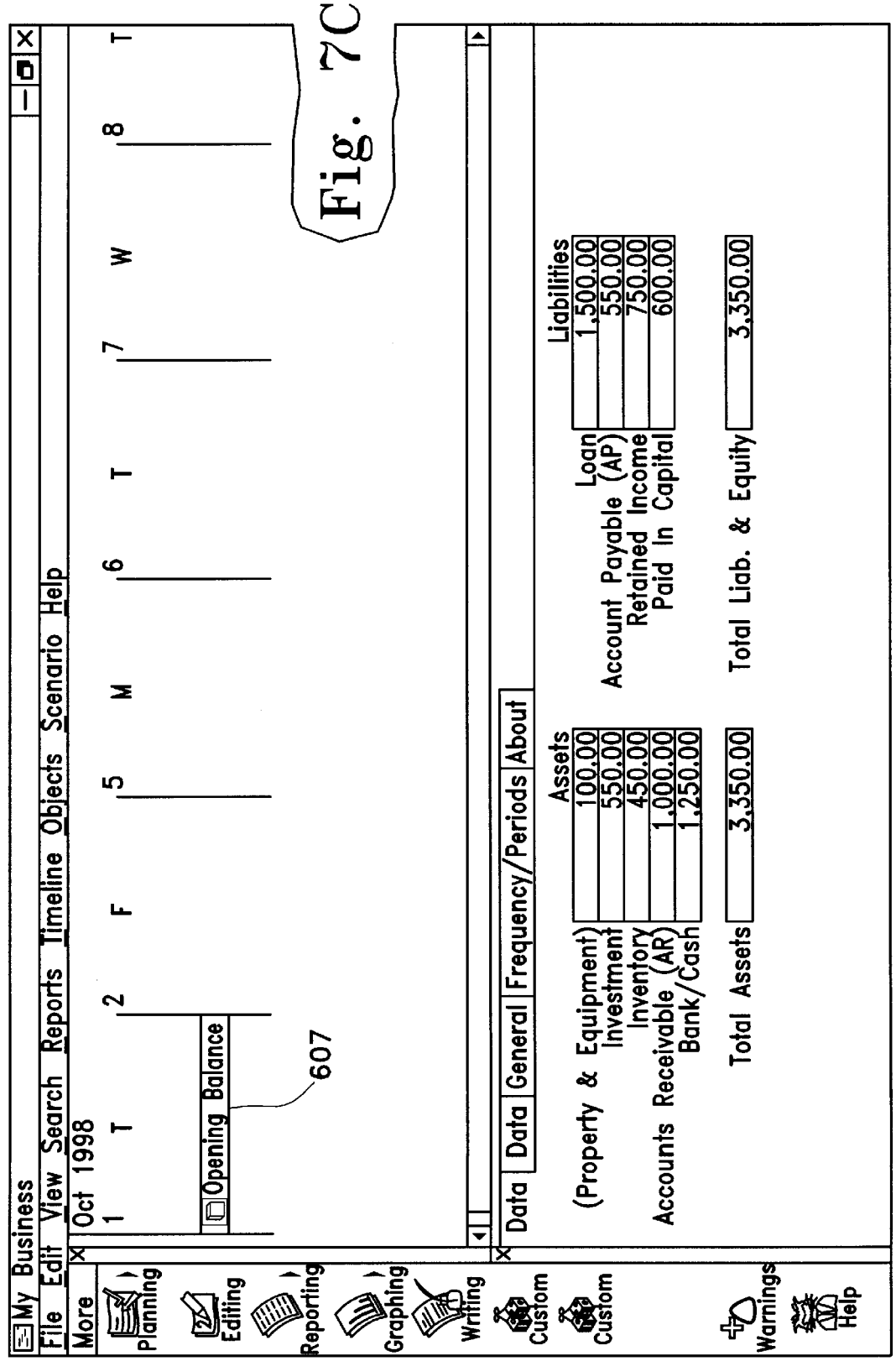

FIG. 7C illustrates a displayed instance 607 of an Opening Balance object and the entry boxes under the "Data" tab with various asset and liability properties already entered.

Figure 7D:
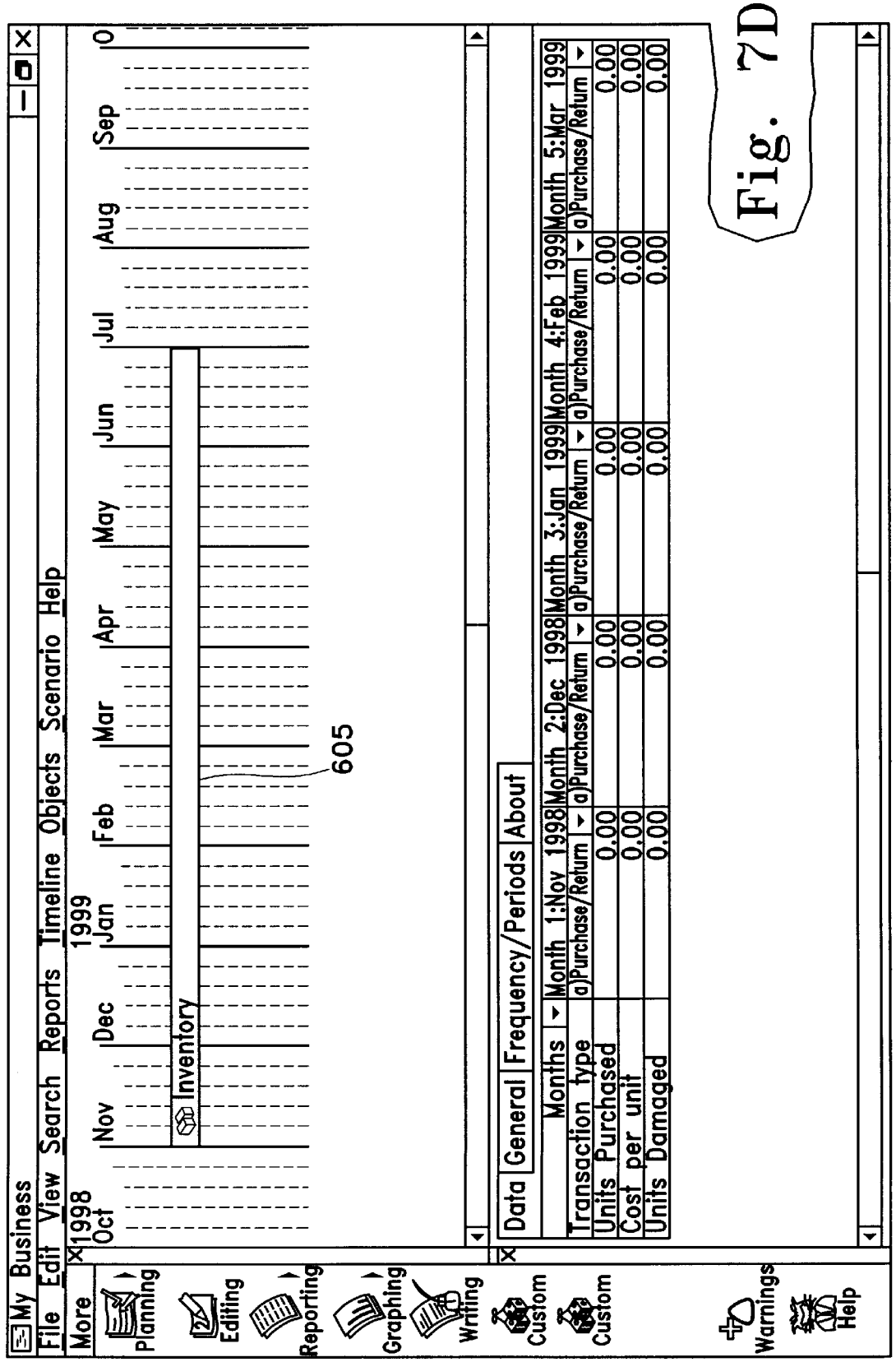

FIG. 7D illustrates a displayed instance 605 of an Inventory object 105 with the entry boxes under the "Data" tab awaiting entry of the relevant property information. It will be noted that a default period of one month has been set for the frequency at which calculations are made.

Figure 7E:
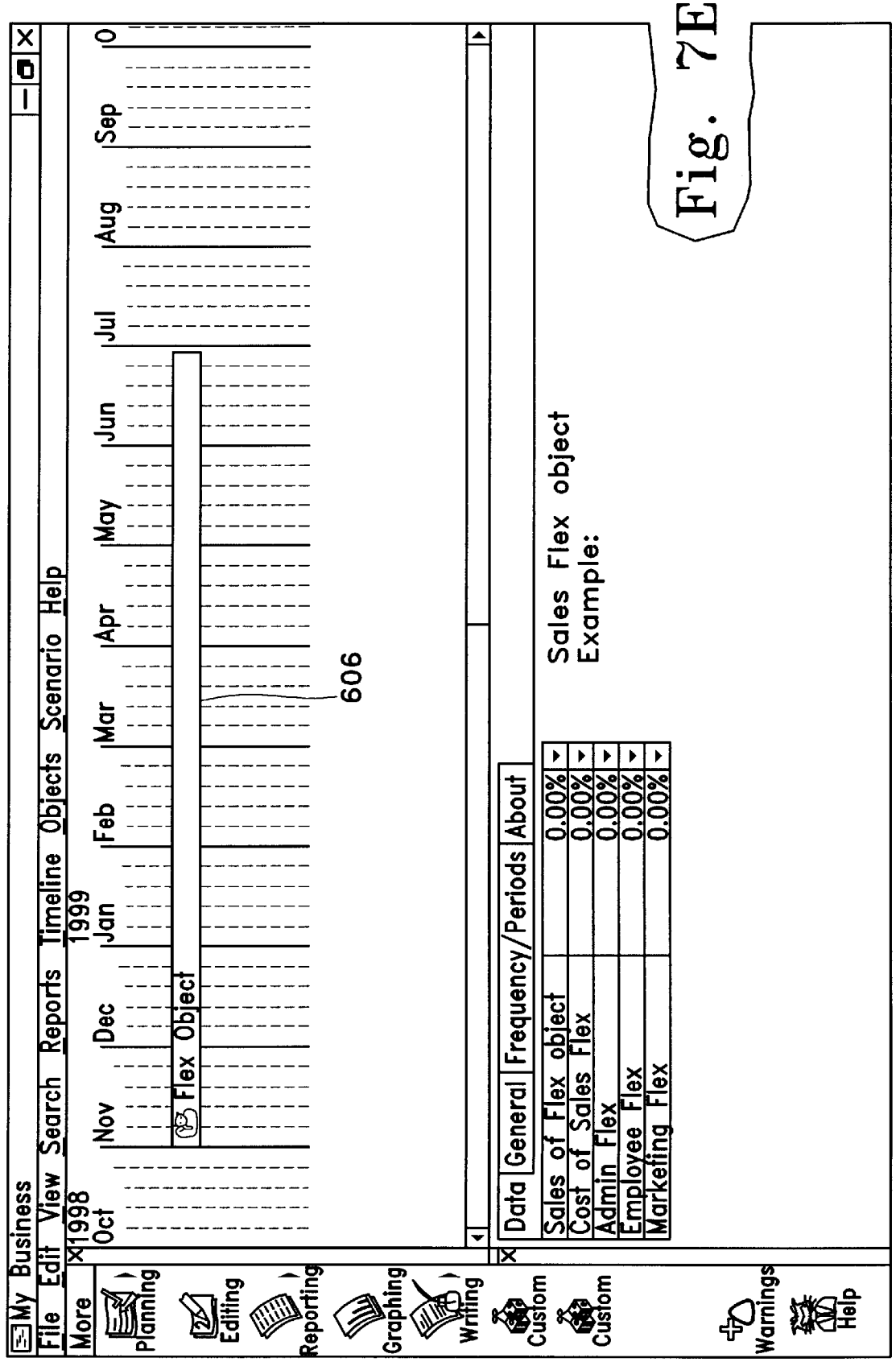

FIG. 7E illustrates a displayed instance 606 of a Flex object 106 with the entry boxes under the "Data" tab awaiting entry of the relevant property information. A flex object is used to provide modification of the results of objects and provides a flexible way of investigating the effects of variations in the properties of the objects.

Some other examples of such object classes, or types, are summarized below.

An Asset object type for property and/or equipment can be used to define the financial value of the asset over time. Once again, simple properties need only be provided including an initial value of the asset, a rate of depreciation, and the length of ownership planned for the asset in question as represented by the positioning of the corresponding object instance on the timeline.

A Cost of Sales object type can be used to model the cost to the user, as an amount of money per item, or as a percentage of sales made. Once again, the entry of simple properties is all that is required, such as an amount, or a percentage and the duration of the period over which the cost is to be taken into account, as represented by the positioning of the corresponding object instance on the timeline.

An Administration cost object type allows modeling of overhead costs by the entry of simple properties such as an amount and the duration of the period over which the costs are to be taken into account, as represented by the positioning of the corresponding object instance on the timeline.

There now follows a description of an exemplary implementation of the modeling system described above.

Figure 8:
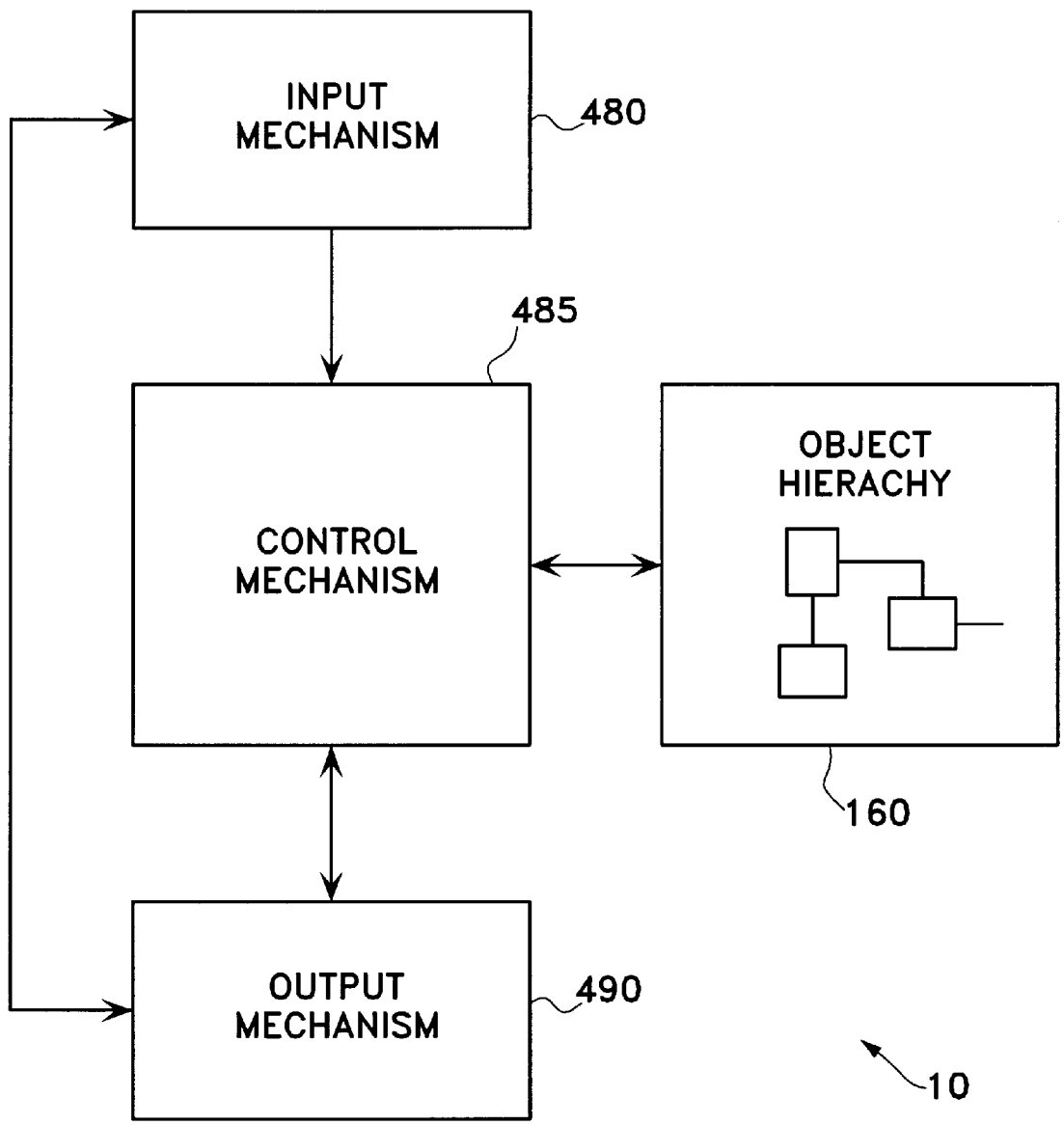
FIG. 8 is a schematic overview of an embodiment of the invention.

As described above, the selection of individual objects from the various object types enables the generation of a hierarchy of object instances for planning and/or modeling. FIG. 8 is a schematic, functional, overview of an example of the invention from one aspect. In essence, an embodiment of the invention, can provide a control mechanism 485 for creating and managing an object hierarchy 160 of time dependent objects, which forms a model of the time dependent system, in response to user input from an input mechanism 480 and requests for output via an output mechanism 490. The input and output mechanism 480 and 490 cooperate, as represented by the line joining them, in that the output mechanism 490 includes the display of representations of object instances and the input mechanism 480 used the display of representations of object instances to control the input of properties to the object instances. The results can be in the form of displayed and/or printed reports. The reports could also be exported (for example as a bitmap). Also the results could include control values for controlling a modeled system or process.

Figure 9:
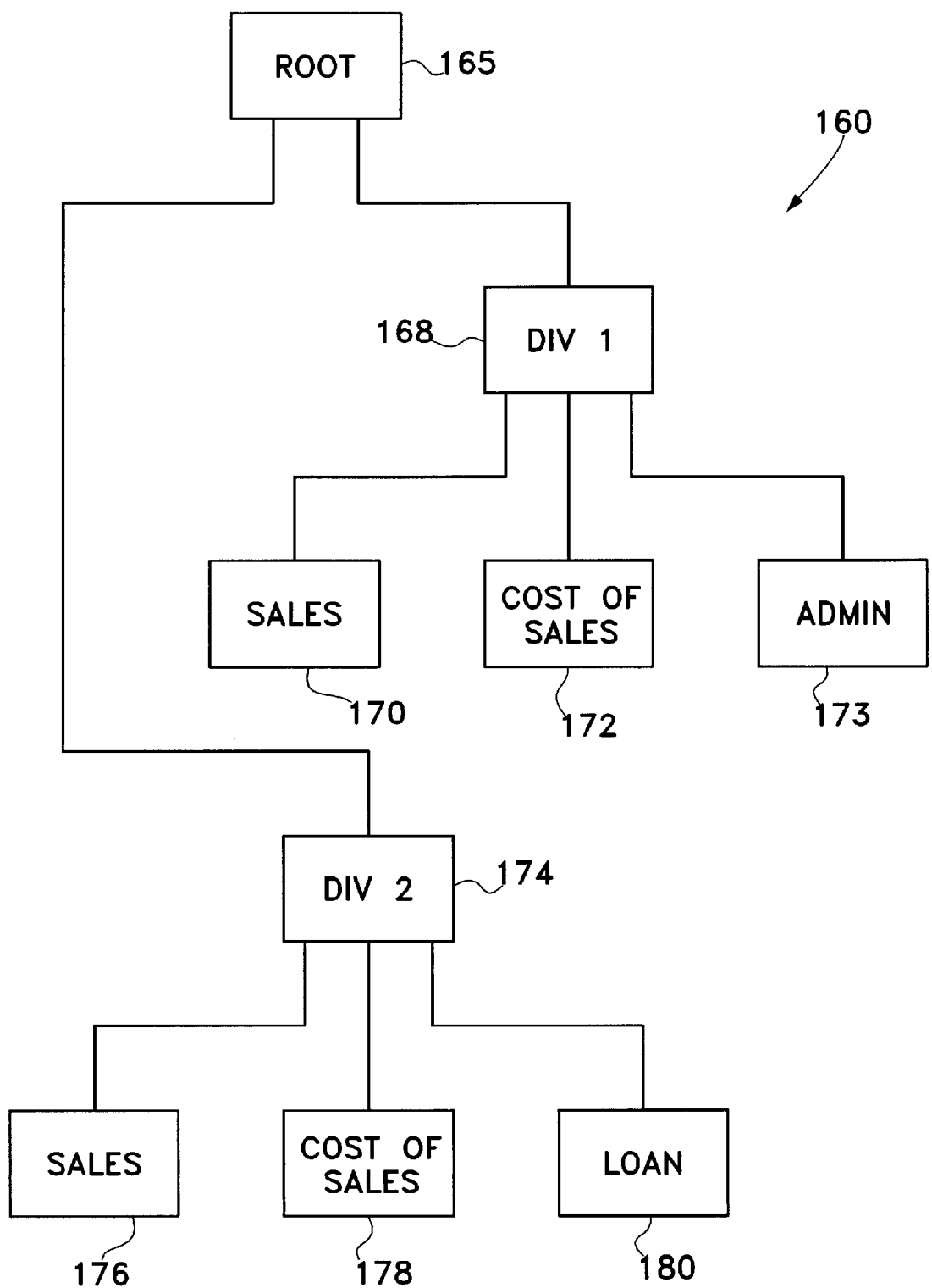
FIG. 9 is a schematic representation of an object hierarchy of an embodiment of the invention.

The displayed instances of the various component objects shown in FIG. 3 are directly associated with the actual component object instances which are generated by the underlying control mechanism 485, or object-oriented program operating environment on selecting the creation of an instance of an object. The objects form a hierarchy by means of the links between those component objects. FIG. 9 illustrates a hierarchy 160 of objects with, at its root, a root object 165 for the model. For the example shown in FIG. 3, a first family of objects is defined with respect to the root object 165. This first family of objects includes a Division 1 object 168, which forms a child of the root object 165, corresponding to the Division 1 object instance 68. A Sales object 170 and a Cost of Sales object 172 and an Administration object 173 are defined as children of the Division 1 object 168 and correspond to the Sales object, the Cost of Sales object and Administration object instances 70 and 72, respectively. A second family of objects is also defined with respect to the root object 165. This second family of objects includes a Division 2 object 174, which forms a child of the root object 165, corresponding to the Division 2 object instance 74. A Sales object 176, a Cost of Sales object 178 and a Loan object 180 are defined as children of the Division 2 object 174 and correspond to the Sales object, the Cost of Sales object and Loan object instances 76 and 78 and 80, respectively.

The hierarchy of objects 160 shown in FIG. 9 is generated automatically by the system in response to the operations performed by the user as described with reference to FIG. 3. This is the hierarchy of objects 160 shown in FIG. 9 forming the model on which planning scenarios may be investigated by adjusting the properties of the objects. Each of the objects shown in FIG. 9 contains data, or references data, defining those properties. As mentioned above, a parent object may also contain, or reference, the properties and/or accounts of the objects that form its children. This means that a child object is then able to do obtain the properties and/or accounts of the other objects by querying its parent object.

Figure 10:
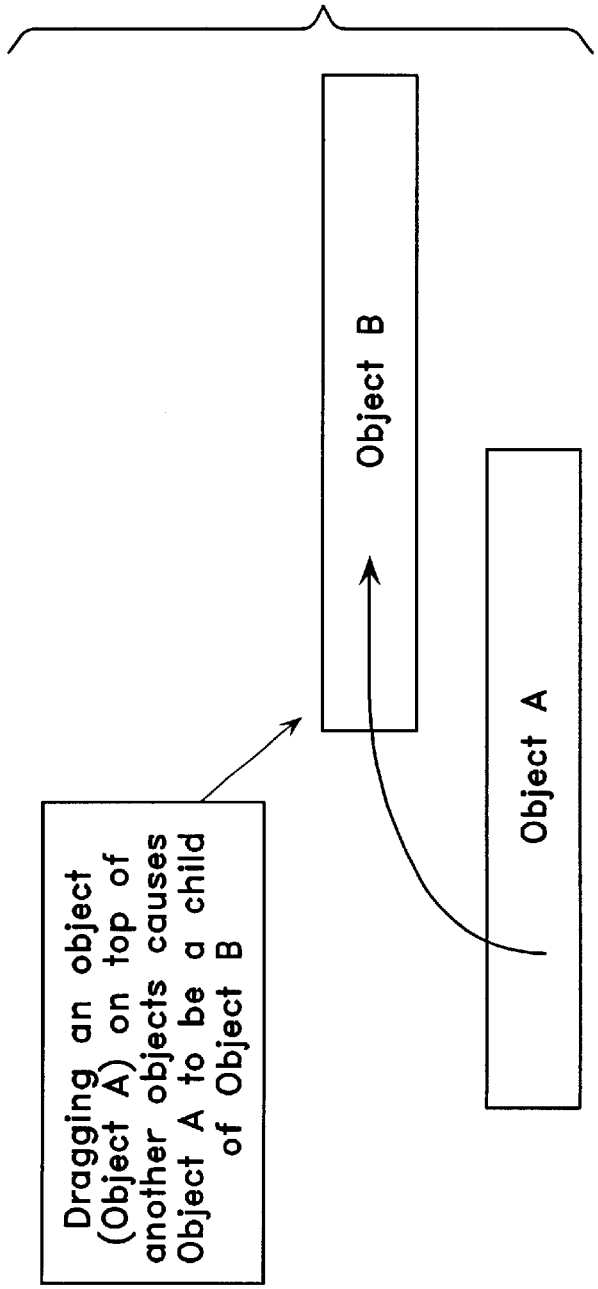
FIG. 10 is a schematic representation of the generation of a parent-child relationship between objects.
Figure 11:
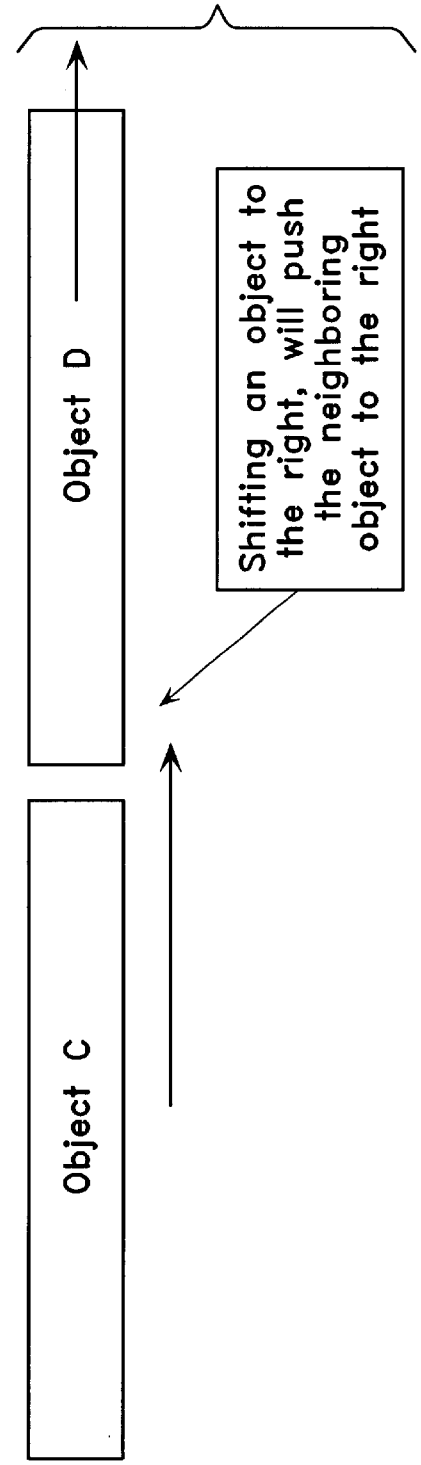
FIG. 11 is a schematic representation of objects mutually exclusive in time.

As has been described with reference to FIG. 3, dragging an object instance (e.g. object A shown in FIG. 10) on top of another object instance (e.g., object B) within the timeframe field 55 in FIG. 3 causes object A to be child of object B. In this manner, a parent child relationship can readily be created for objects on respective object lines. As also described with reference to FIG. 3, placing representations of object instances side by side on one object line will prevent the objects from having coextensive lifetimes. Thus, for example, shifting an object instance C to the right, as shown in FIG. 11, will cause the adjacent object instance D to move to the right when those two object instances touch. These relationships are held within the objects by means of appropriate links between the objects via the parent(s). The various actions described above automatically cause the modification of the properties of the objects.

The power of an embodiment of the invention is the ability to model a system or activities from individual objects. Each object defines the necessary functionality for modeling an element of that system or those activities, with the objects being assembled into an object hierarchy defining that system or a combination of activities. As has already been indicated, the objects have an existence in "time", that is the objects have a start and an end date, and perform calculations on the basis of time-related properties. In order to generate a hierarchy, the objects also define links to other objects, and the calculated results of one object affect other objects.

Properties can be associated with various aspects of the objects, such as the start and end, the markers for the calculation datum points, the body of the object instances and also the links.

Indeed, the links could be defined separately to possess properties. For example, for objects on one object line, a link between the objects could define a degree of elasticity, or lack of elasticity, between those objects, or for example a minimum separation in time. Also, for hierarchical links, the properties could represent inter-dependencies between the objects at either end of the link.

An embodiment of the invention is not an accounting system. However, it can be used to model an accounting system. It can also be used to model many different types of systems. However, in the following, terminology taken from the accounting world is used to describe aspects of an embodiment of the invention. For example, the term "account" is used to define a repository for a time-series of values, although the time-series of values may, or may not, relate to financial values. It could, by way of examples, relate to numbers of employees, or yields of a chemical process, or energy consumption values for the environmental controls of a building.

At a conceptual level, the present embodiment of the invention employs a general ledger (GL). The concept of a general ledger, in the manner of a general ledger in a traditional accounting system, keeps track of the current state (or value) of various accounts. The general ledger can be equated to a database containing time-series of values that can be indexed or updated based on an account identity and a date. Conceptually, object communication within the modeling system is effected through the general ledger, although in practice it is effected via the objects. The concept is that objects post values to the general ledger and then objects query the general ledger for the total values for a given account on a given date. This concept also applies to reports, which obtain required values from the general ledger. Conceptually, therefore a report will query the general ledger for the required values for a given date.

Although accounting terminology is employed here, it should be understood that the general ledger concept enables non-financial as well as financial data values to be tracked. For example, if a report or an object requires a number of staff working on a particular date, the report or object would query the general ledger for the value concerned. The general ledger is organized as a hierarchy of accounts. Each account contains an array of values for a series of dates (that is a time-series of values for a given account). For example, it is possible to query the general ledger for a value in a sales account on a particular day. There is a unique value for each account for a given day.

Figure 12:
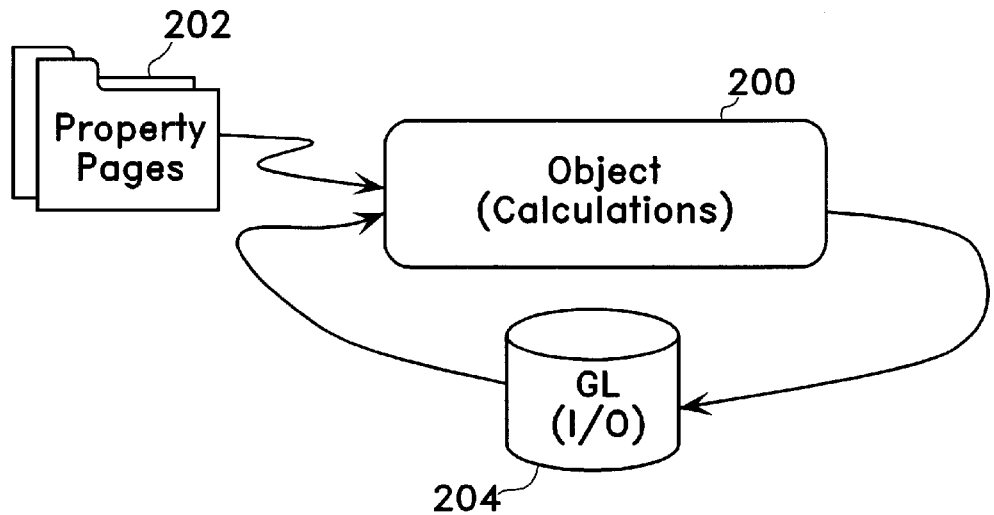
FIG. 12 is a schematic representation of the communication between objects via accounts.

FIG. 12 is intended to represent the use of the general ledger (GL) concept 204 by the objects. As shown in FIG. 12, an object 200 performs calculations on the basis of properties from property pages 202 and/or previous results from the general ledger 204, and then posts results to the general ledger 204. The results of the calculations can then be queried by another, or by the same object from the general ledger 204. Although the general ledger is conceptually separate from the objects, in practice, in the present embodiment it is held by a property manager function within the objects, or the parents of the objects in question. Thus, during the definition of an object, as well as defining the calculations, or transactions, to be performed, the input sources and output destinations for those calculations are also defined.

The nature of the accounts can be illustrated, for example, for financial transactions, where two posting dates, or dates on which the general ledger of values will be increased, or decreased, can be defined. These two dates can be defined as the accrual impact day and the cash impact day. The accrual impact day is the date on which a transaction is recognized by the object (this would correspond to the data that shows up on the income statement on the balance sheet). The cash impact day is the date on which the cash from the transaction affects the bank account and would show on the cash flow statement. Three accounts can be defined that are affected by a financial calculation. They are an accrual account, a cash account, and holding account. It is the accrual account that recognizes the occurrence of a transaction, but not necessary the receipt for payment. On the accrual impact day the accrual account is increased. The cash account represents how much money is currently in the bank. On the cash impact day the cash account can be increased or decreased depending on the type of transaction. The holding account represents the current amount of money currently owed and owing by the object.

Figure 13:
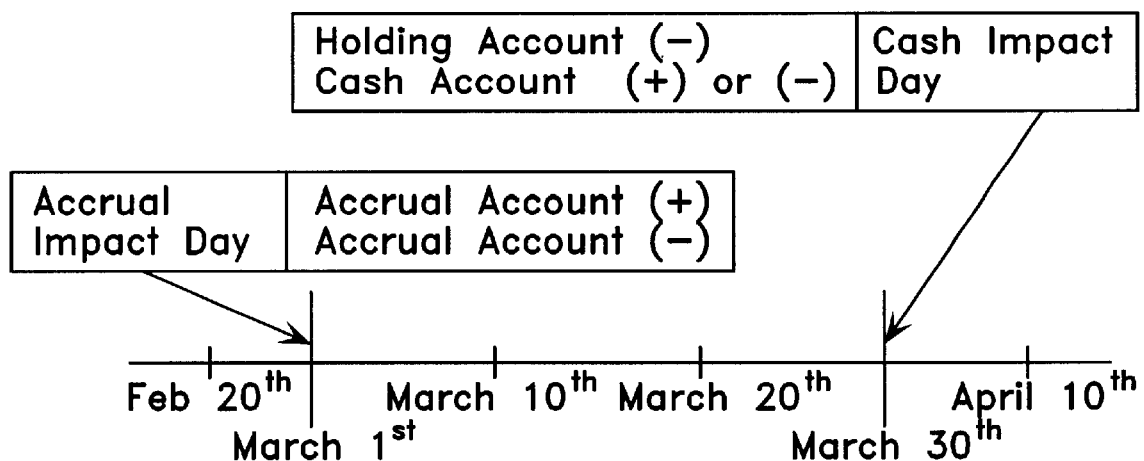
FIG. 13 illustrates the timing of balancing entries in an embodiment of the invention.

Thus, as already mentioned, even though an embodiment of the present invention is not an accounting system, the various transactions can be described using accounting terminology, particularly in the case of a financial application for the invention. For every financial calculation, there are two transactions, each of which comprises two balancing entries as represented in FIG. 13. The first transaction occurs on the accrual impact day, when a transaction is recognized, but before the required sum is paid or received. On the accrual impact day both the accrual account and the holding account will be increased by the transaction amount. The second transaction occurs on the cash impact day, when the required sum is received or paid. This amount is the same as used for the first transaction. On the cash impact day the holding account (as used on the first transaction) is decreased by the appropriate value and the cash account is increased or decreased depending on whether it is an incoming or outgoing amount. There are multiple cash impacts with the total being equal to the first transaction.

As mentioned above, objects post values to the general ledger. The periods within which an object posts values to the general ledger is determined by several factors. The most important factor determining when this occurs is the granularity, or object frequency, as mentioned with reference to FIG. 3. This granularity can be set by the user and can be based on several different periods, for example a selectable number of one or more days, weeks, months, quarters, years, or combinations thereof, in the present embodiment. The relevant datum point at which the relevant calculations are made can be set to the start or the end of a given period, or indeed at any selectable time within the period. Another factor which can be relevant to determining the timing of posting results is a delay property (e.g., a collection/payment term period in a financial application), which can be set depending upon the time it takes for the accounting value (e.g., cash in a financial application) to actually arrive in the account after a transaction is performed.

FIG. 14 provides an overview of a process for creating an object. The process essentially comprises two stages. The first stage is an object definition stage. The second stage is an object build stage.

In the object definition stage, necessary inputs are supplied to a database. After the necessary accounts, properties, object calculations, and criteria have been defined and entered into the database, the user then selects a build operation that initiates the automatic build process. The build process analyses the access database and generates appropriate code. This code is then compiled to create an executable file that is registered with the operating system. The next time that the modeling system is run, the new executable is available in the object selection field and the new object can be placed within the timeframe field.

When performing calculations, the objects require access to certain assumptions, or inputs. These assumptions have to be stored within the model. For example, an object for calculating salary expenses might require the number of employees and the employees' annual salaries. These assumptions are the properties mentioned earlier. Most property values are set by the user when adding or modifying an object when viewing a planning screen, for example as illustrated with reference to FIG. 3. When creating an object, the properties that can be changed by the user are defined and a so-called property page is defined (see FIG. 15). The system also determines property values to be used internally for its calculations. For example, the present embodiment of the system sets a default duration, or lifespan, property for an object to be the length of that object in days.

FIG. 15 is an illustration of a property entry window where a new property can be created and an existing property can be edited. With reference to the various fields shown within the property entry window, the following items in particular are noted. The property ID is the identity for the property. The caption is read only text seen in reports and on the property page. The description gives more detail regarding the intention of the property. The type can be one of, for example: a value; an array of values; a time-series of values; a state; a Boolean; a string; a timing; a duration; a link; a bit map; a binary stream (or binary large object (blob)). The property type determines how the property acts in the property page and the object calculations. If the property is a string list type, this is where the items in a string list are entered. The multiple item entry determines how a tally amount is generated for a property that includes sub-properties as described, for example with reference to FIG. 7A. Where appropriate, the property can be represented in a currency format or a percentage format by checking the appropriate boxes. Also, the property can be set as a global property by checking the global property box.

FIG. 16 is an illustration of an account entry window where an account can be defined. With reference to the various fields shown within the account entry window, the following items in particular are noted. The account name is the name given to the account. Account IDs used elsewhere in the system (for example in object calculations and reports) are created by concatenating account prefixes specified in a relations page associated with the account name. The account name is unique. The caption is read only text seen in reports and other user areas. The description gives more detail regarding the intention of the account. The report order determines the sequence of rows in some automated reports. The type determines the account type and can be one of a contributory account (a conventional account as in traditional accounting where account values carry forward from day to day) or a non-contributory account (account values do not carry forward from day to day). Where appropriate, the account can be represented in a currency format or a percentage format by checking the appropriate boxes. The relations page under the relations tab defines prefixes that are used with the account name to create an account ID. Within the relations page, the account prefix is the prefix used with the account name to create the account ID. The direction indicates whether the accounts should be increased or decreased when used as the output for receiving the results of object calculations. The parent/child field sets out read only fields that display the current parent in a chart of accounts for created accounts.

FIG. 17 illustrates a chart of accounts. This defines a hierarchy of accounts. Various fields are identified in the chart of accounts. These include: an ID field for a database index key for a parent-child reference; a parent ID field for a parent account in a hierarchy relationship; a child ID field for a child account in the hierarchy relationship; and a contribution mode field indicating if the child's values are added to or subtracted from the parent's value.

FIG. 18 illustrates an object entry window where objects can be defined. The object name field contains the object name. The object name is unique. A calculations page (as illustrated in FIG. 18B) under the calculations tab contains property fields within which the properties to appear in the property page can be defined and a calculations field within which the actual object calculations can be defined. An input detail page (not shown) under the input details tab allows further refinement of the objects property page. For example, the conditions under which a prompt is visible can be created, as well as dynamic prompts that change depending on the current context. A criteria page (not shown) under the criteria tab can be used to set appropriate criteria and associated error messages. A user notes page (not shown) under the user notes tab is where context sensitive help and categorization can be set. A development notes page (not shown) under the developer notes tab can be used for development notes. A children page (not shown) under the children tab can be used to define children which will automatically be attached to the object when an object is placed into the model, i.e., when placed onto the timeframe field 54 of FIG. 3.

FIG. 18A illustrates the property fields of the calculations page of the object entry window of FIG. 18 in more detail. The various fields illustrated in FIG. 18A are as follows. The ID field contains the property to be displayed in the property page. The order field indicates the order in which properties are to be displayed. The caption field is a read only field that is displayed in the property page. The default field contains a default value. If the read only box is checked, the user will not be able to edit this property. If the show box is not checked, the property is not visible on a property page.

FIGS. 18B and 18C illustrate the bottom section of the calculations page of FIG. 18 in more detail. The bottom section of the calculation page includes two sub-pages. A first sub-page page (called the calculations sub-page) under the calculation tab shown in FIG. 18B is used to define the actual calculation of the calculation engine of the object. The second page, the calculations options page, under the calculation options tag shown in FIG. 18C, is where characteristics of the calculations are defined.

In FIG. 18C, the description field contains an internal description of the calculation performed by the calculation engine of the object. The output account field identifies the account to which results are posted. For calculations that create double entries, this is the accrual account. The C++ code box is checked if the calculation is defined in terms of C++ code. The equation field contains an equation defining the actual calculation to be performed by the object. The result will be placed in the identified output account. An object can have multiple calculations with multiple accounts.

In FIG. 18C, the description field contains the same description as shown in FIG. 18B. Radio buttons are provided for selecting the timing of when a calculation is effected. For example, a calculation can be evaluated only once at the beginning of the object, or at the end of the object, at some regular intervals within the object, or on specific dates. These options are set by selecting the appropriate radio button. The time dependency of the value can be set by means of the radio buttons to identify whether the calculation of property values as well as accounts are to be dependent on time (which is the setting for almost all cases) or independent of time.

Figure 19:
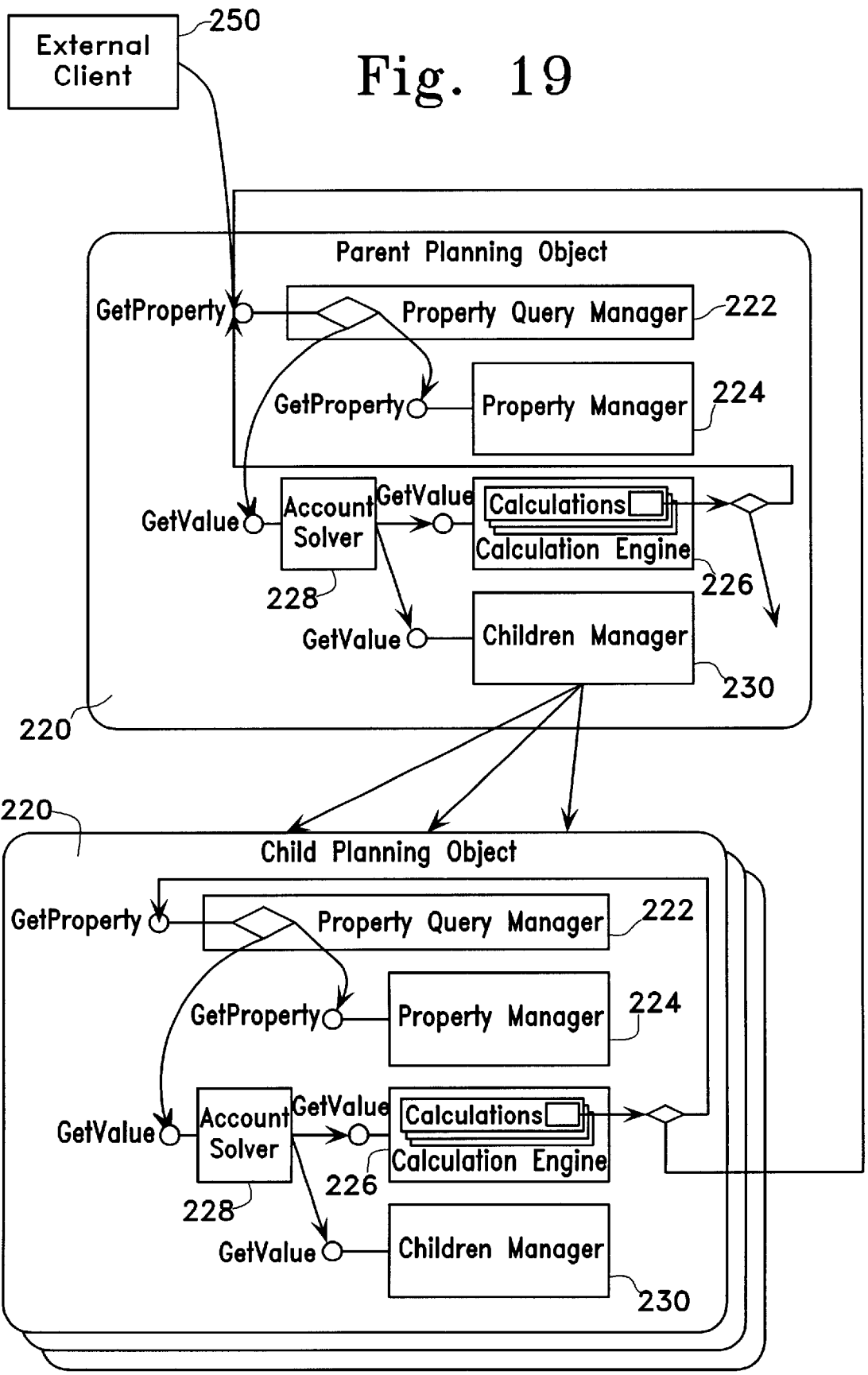
FIG. 19 illustrates the structure of and relationship between parent and child objects.

FIG. 19 is a schematic representation of the relationship between a parent object 220 and one or more child object(s) 240. Each object includes a calculation engine 226 defined by the equation in the equation field of the calculation page illustrated in FIGS. 18 and 18B. Each object also includes a property query manager 222 that is responsive to a query from an external client 250 (for example from a report mechanism) to get a property or value (account) as required by the query. The property manager is responsible for determining whether the query is for property or account values.

The property query manager 222 references a property manager 224 to get a property required by the query. As has already been discussed, an object holds its own properties and copies of the properties of its children. These can actually be stored within the object, or could be referenced from elsewhere by suitable links under the control of the property manager 224.

The property query manager 222 references an account solver 228 to get an account value as required by the query. For each calculation the accounts solver 228 queries the calculating engine 226 to operate on the properties at the timings defined by the calculations options page of FIG. 18C to generate the values. The calculating engine 226 is operable to determine whether the properties required for the calculation are local to the object or whether they need to be obtained from the parent. If the value is to be queried from the parent, then the value is requested from the parent's property manager 224.

If the query relates to a child account, then the account solver 228 queries the children using the children manager 230. The children manager 230 queries each of the children for the account values. As indicated above, a child of a parent object can obtain the properties of other children of its parent by referencing the parent. An example of this is where, for example, a cost of sales object needs the details of sales for the parent of the cost of sales object. In this case the sales properties for the associated sales object can be obtained from the parent object.

As well as the elements indicated above, an object can include its own rendering engine to control the display of the object. Alternatively, a separate rendering facility could be provided, with the object supplying its identity and/or other parameters to the separate rendering engine.

Figure 20:
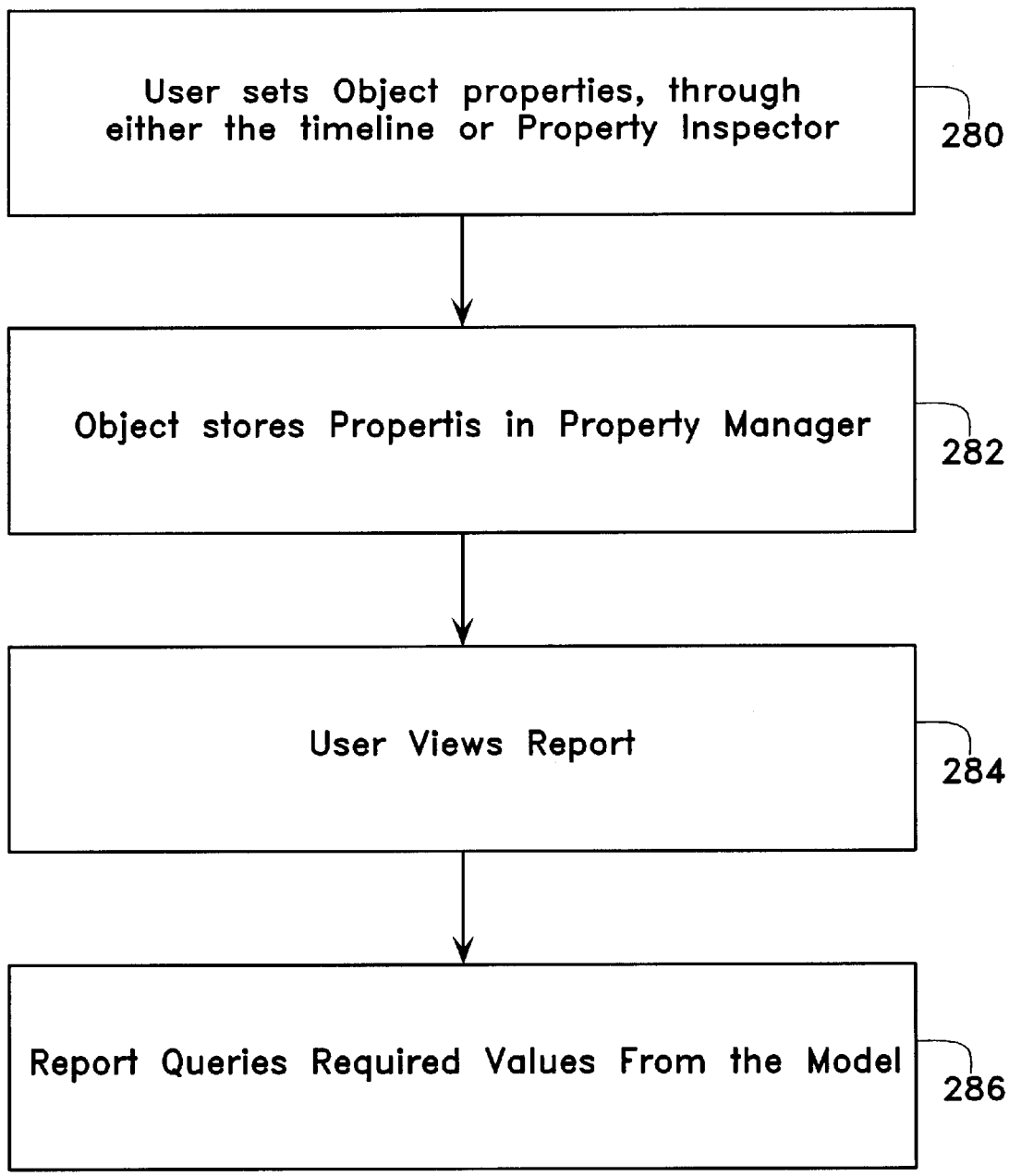
FIG. 20 is a flow diagram giving an overview of the generation of a model and the querying of the model for creating a report.

FIG. 20 summarizes the process involved in creating and operating a model. In step 280, the user sets object properties, either using the positioning of the object representations on the timeline, or through the data field for a property (otherwise known as the property inspector). In step 282, the object stores the properties in the property manager 224. In step 284, the user accesses a report view, for example as illustrated in FIG. 6. In step 286, in response to the user accessing the report view, the report manager, for example the external client 250 of FIG. 19, queries the required values from the object concerned, for example the object 220 of FIG. 19.

Figure 21:
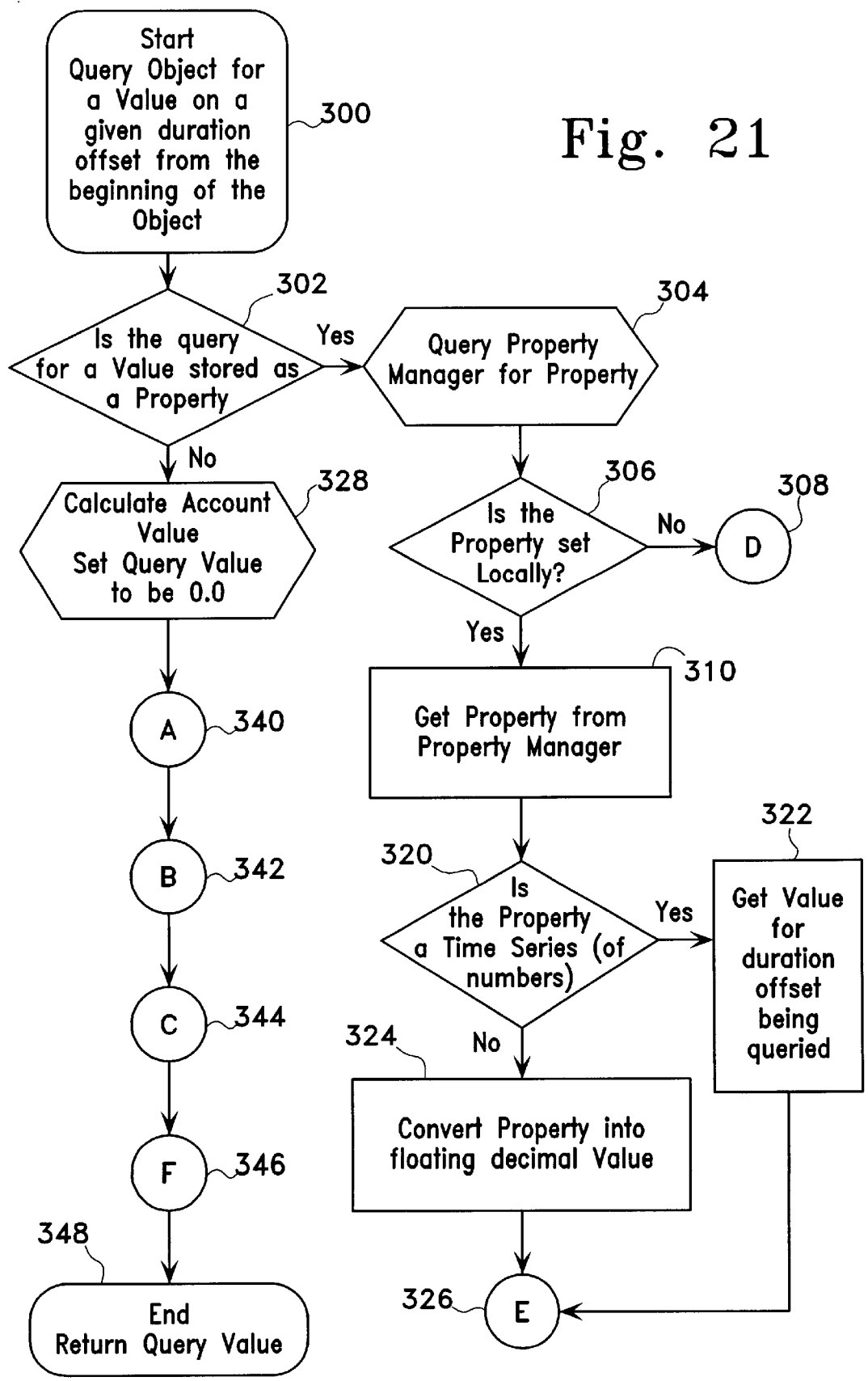
FIGS. 21 to 21E are flow diagrams illustrating, in more detail, the querying of a model.

FIG. 21 is a flow diagram illustrating the querying of required values from an object. This querying is illustrated in the context of a financial application, although it should be appreciated that similar methods are employed for querying the required values for other applications. In step 300, the process starts by an object being queried for a value on given duration offset from the beginning of an object. In step 302, a test is made as to whether the query is for a value stored as a property, or not (i.e., an account). If it is, then in step 304, the property manager 224 of FIG. 19 is queried for the property. In step 306, the property manager determines whether the property is set locally. If it is, then in step 310, the property is obtained from the property manager 224. In step 320, a test is made as to whether the property is a time-series of numbers, or not. If it is a time-series of numbers, then in step 322 the value for the duration offset being queried is obtained and control passes to step E 326. If the property is not a time-series of numbers, then, in step 324, the property value is converting to floating decimal value and control passes to step E 326. Returning to step 302, if the query is not for a value stored as a property, then, in step 328, an account value is to be queried and a query value is set to 0.0. Control then passes to step 340, which is expanded in FIG. 21A.

Figure 21A:
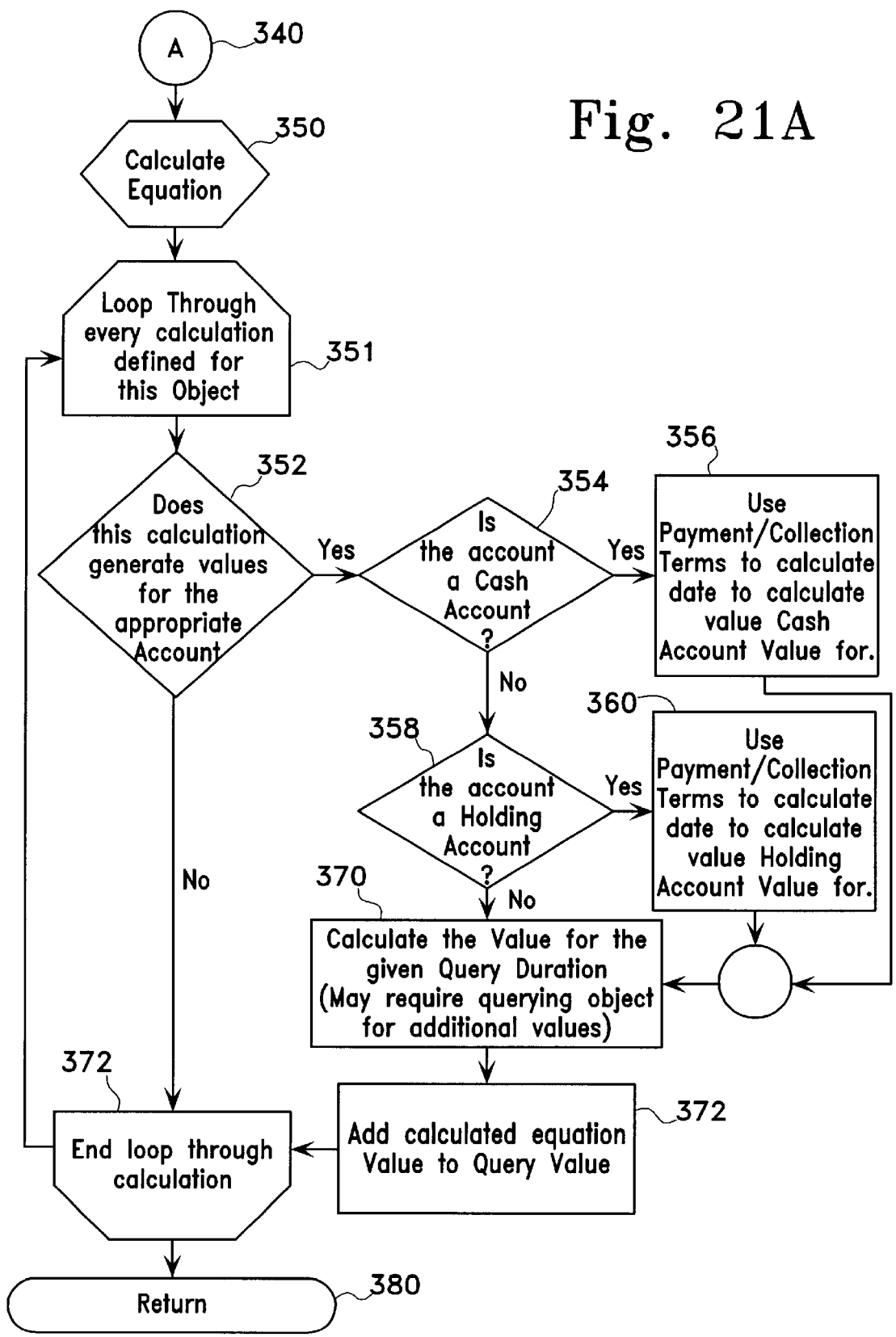

In FIG. 21A, following step 340, the code forming the calculation engine is executed in step 350. This code implements the equation defining the functionality of the entity modeled by the object concerned. In step 351, a loop is started for each calculation defined for this object. In step 352, a test is made at to whether this calculation generates values for the appropriate account. If this is true, then in step 354, the test is made whether the account is a cash account.

If it is, then in step 356, payment/collection terms are used to calculate a date for calculating a cash value. If, in step 354, the account is not a cash account, then, in step 358, a test is made whether the account is a holding account. If it is a holding account, then in step 360, payment/collection terms are used to calculate a date for calculating holding account value. If, in step 358, the account is not a holding account, or following on from steps 356 or 360, a value for a given query duration is calculated in step 370. The calculated equation value is then added to the query value in step 372. If, in step 352, the calculation does not generate values for an appropriate account, or following on from step 372, control passes to step 374. If this is the end of the loop, control passes to step 380, otherwise control passes back to step 351. From step 380, control returns to step 340 of FIG. 21. Control then passes from step A 340 to step B 342, which is illustrated in more detail in FIG. 21B.

Figure 21B:
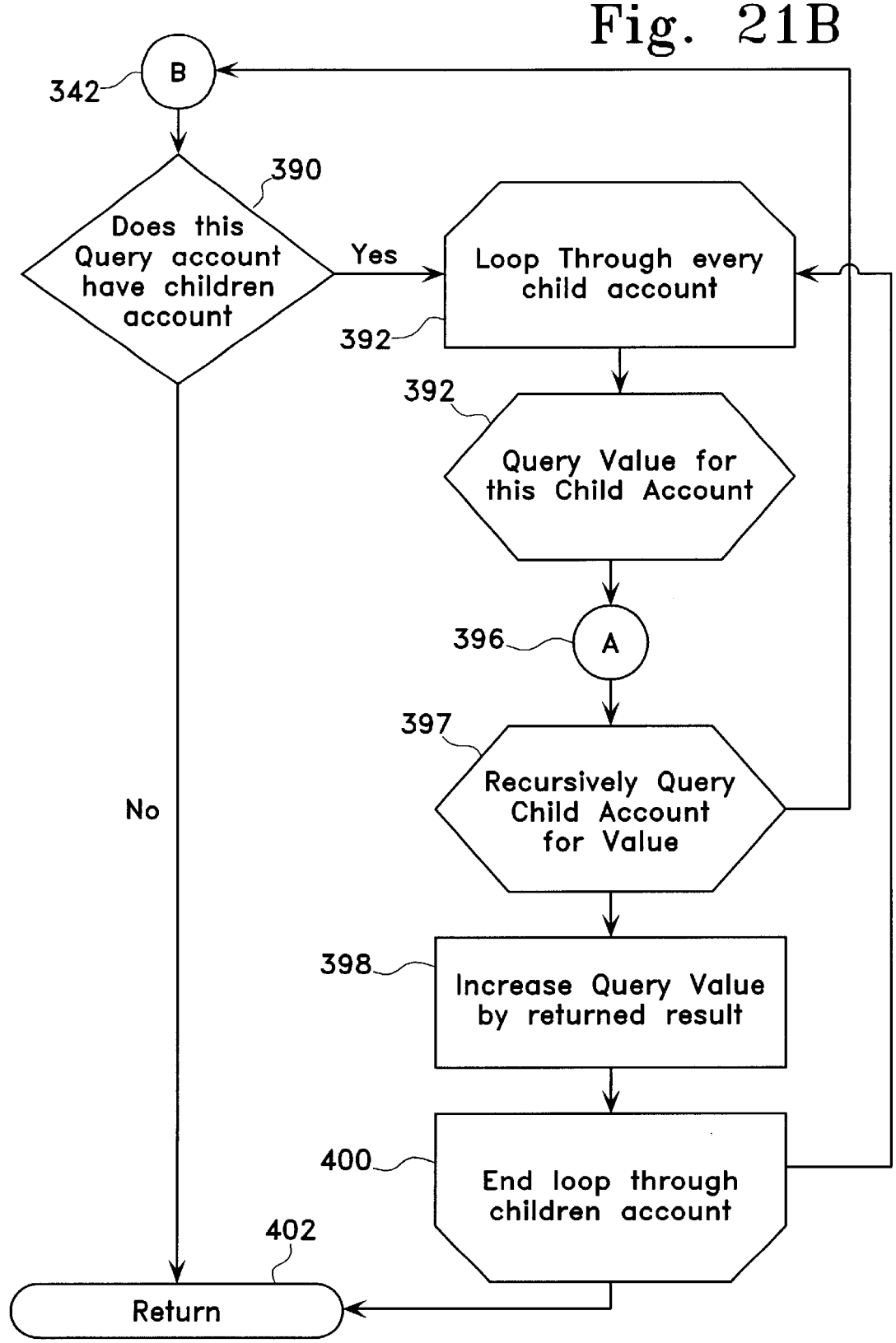

As illustrated in FIG. 21B, following step 342, a test is made in step 390 as to whether this query account has any child accounts. If the answer is yes, then, in step 392, each of the child accounts is looped through. In step 394, a value for the child account is queried. Control then passes to step A 396, which is illustrated later in more detail in FIG. 21D. Following step A 396, in step 397, control either passes back to step 342, for recursively querying a child account for value, or it passes to step 398. In step 398, the query value is increased by the returned amount. If in step 400, the loop for the child account is not complete, control passes back to step 392. When, in step 400, the looping through the child accounts is complete, or, in step 390, the query account does not have any child accounts, control passes to step 402 for return.

Figure 21C:
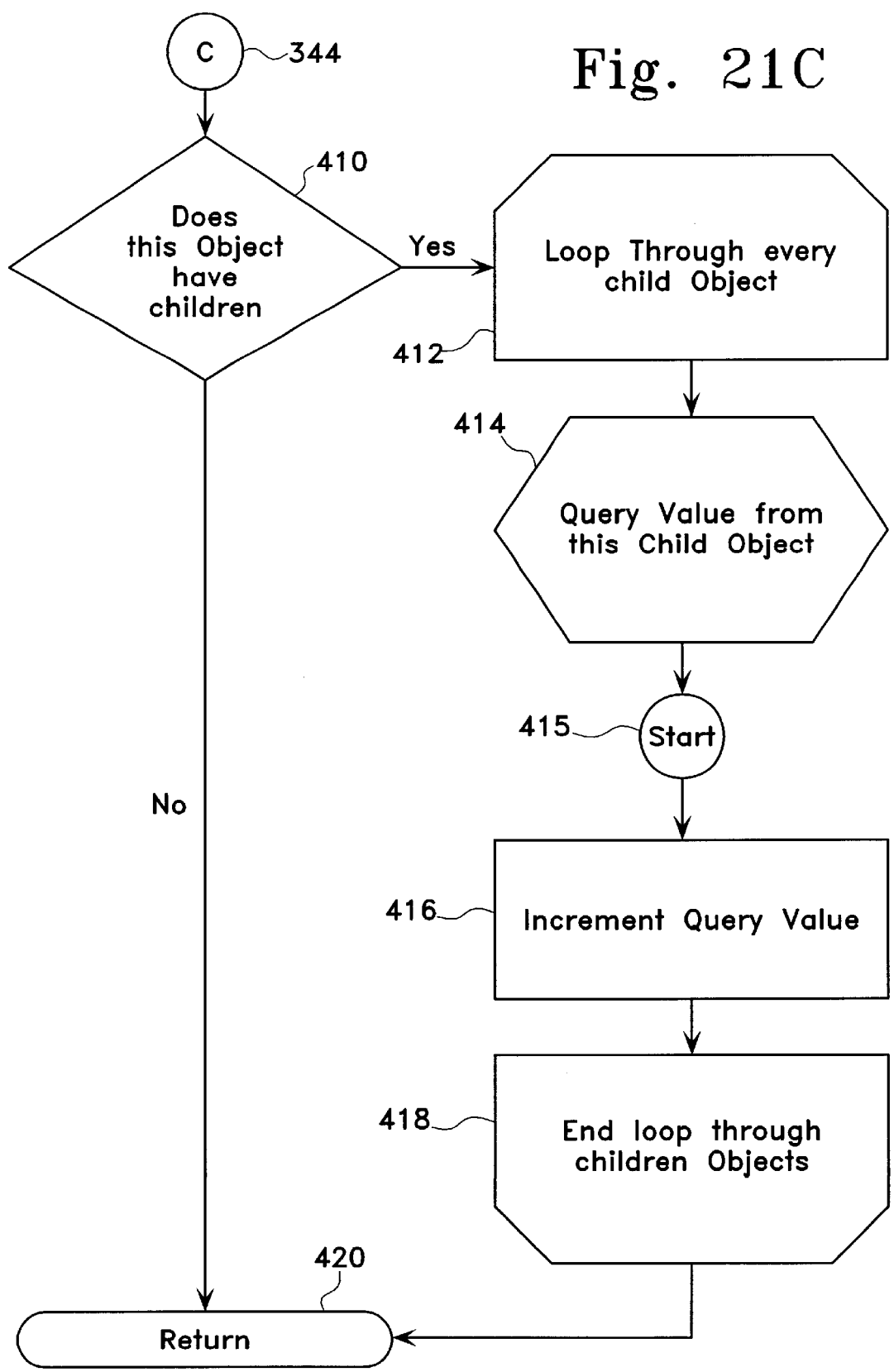

Following step B 342, control passes to step C 344, which is illustrated in more detail in FIG. 21C.

In FIG. 21C, following step 344, a test is made as to whether the object has any children. If the answer is yes, then a loop is started for each child object at step 412. In step 414, a value is queried from the child object in question. This causes a recursive loop at step 415 back to the initial start 300 shown in FIG. 21. Eventually, control returns to step 415 and then passes to step 416. In step 416, the query value is incremented. In step 418, if the loop through the child objects is not complete, control passes back to step 412. If, in step 410, the object does not have children, or on completion of the loop in step 418, control passes via step C 344 to step F 346.

Figure 21D:
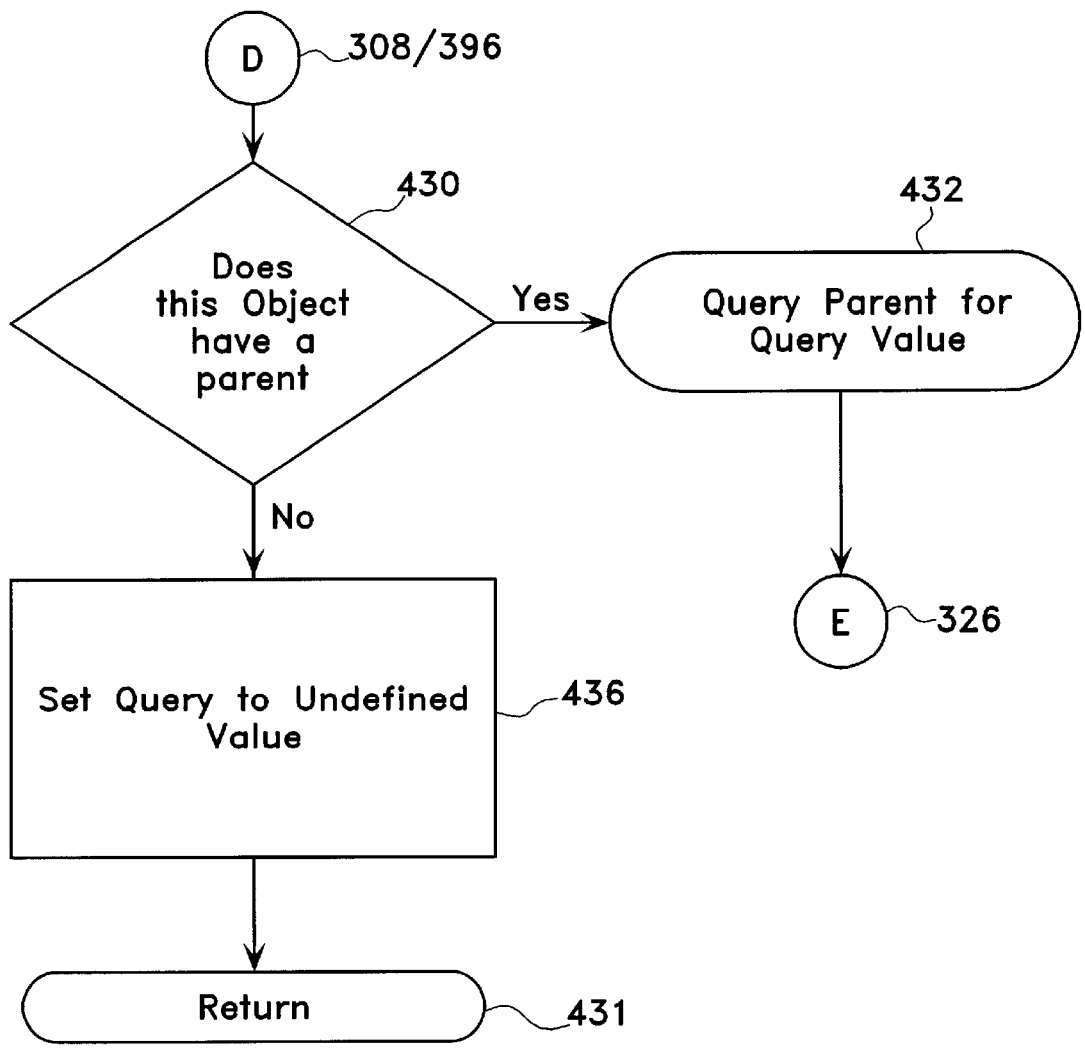

As mentioned earlier, step D 308/396 is explained in more detail in FIG. 21D.

In FIG. 21D, following step 308/396, a test is made in step 430 as to whether an object concerned has a parent. If the answer is yes, then in step 432 the parent is queried for the query value. Following step 432, control passes to step E, 326, which corresponds to step E 326 of FIG. 21. If in step 430, the object concerned does not have a parent, then the query value is set to an undefined value in step 436 and control is returned (step 431) to the calling function (step D 308 or step D 396).

Figure 21E:
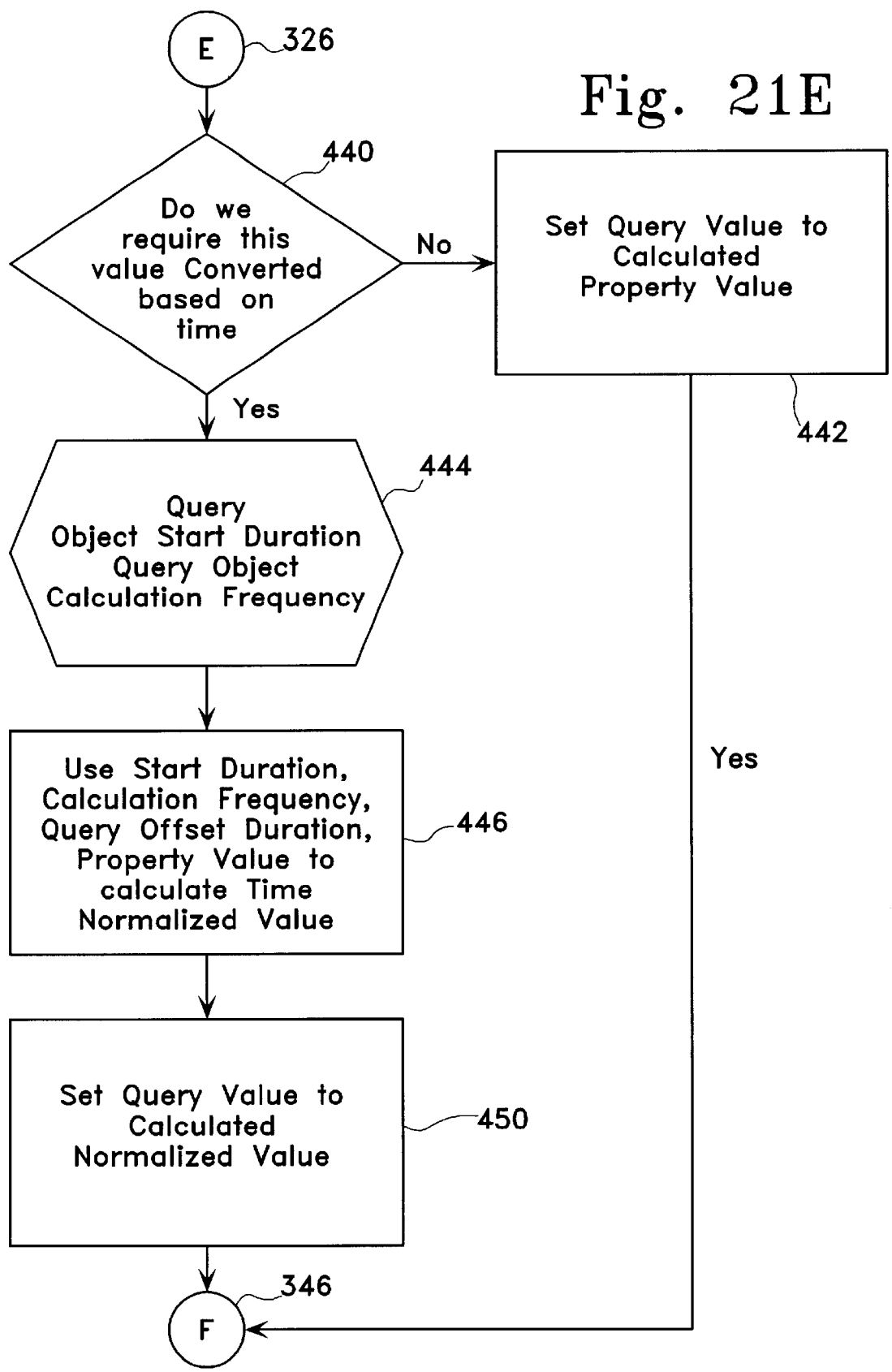

Step E 326 is explained in more detail in FIG. 21E. Following step 326, a test is made in step 440 as to whether a value is to be converted on the basis of time. If the answer is no, then in step 442, the query value is set to the property value and control passes to step F 346. If, however, in step 440 the answer is yes, the object start duration and the object calculation frequency (granularity) are queried in step 446. In step 448, the start duration, calculation frequency, query offset duration, and property value are used to calculate values for a given object granularity (otherwise known as time-nornalized values). The query value is set to the calculated normalized value in step 450, and control passes to step F 346 as illustrated in FIG. 21. Also, following step C 344 in 21, control passes to step F 346. From step F 346, control passes to step 348, where the query value is returned.

Thus, the operation of querying an object for a time-normalized series of values has been set out in FIGS. 21 to 21E. Using this mechanism, it is possible for the objects to pass properties and time-series of values, or accounts, between each other in order to generate an appropriate output for report. Accordingly, reports can be generated in real time on the basis of the properties supplied to the objects by means of the data field 58 and/or the timeframe field 54 illustrated in FIG. 3.

The use of objects to form a model of the system or activities to be modeled provides an extremely flexible and user friendly method of generating a planning system. Each of the objects can comprise pre-defined characteristics appropriate for the class, or type of object concerned. Each of these object types can be thought of as representing a planning entity type, with the specific instances of the objects representing specific planning entities.

New objects can be created as desired in order to model new classes of object. As mentioned, the use of the object-based approach means that the overall presentation and understandability of the planning operation is much easier for the user.

Standard object types could be developed and stored in a library, for example as part of a web-site, and then be downloaded on demand. Alternatively, they could be stored locally, or be packaged with the modeling system. Thus, the objects could be provided on a carrier medium. An object defines the functionality of a planning entity. It includes a definition of a time dependent property and a definition of time-dependent operations configured to respond to input property values for the time-dependent properties to produce a time-series of output values.

Also, the storage of properties within, or associated with individual objects, means that many alternative scenarios can be established within a single model by the storage of multiple sets of properties for each object, or at least selected objects, within the model. As links are also definable as properties, the flexible linking of objects is possible. This can all lead to a very flexible system for the generation of reports for multiple scenarios without a proliferation of models, as would be needed using spreadsheets.

A further feature of the invention that facilitates the selection of particular scenario having a given combination of properties for objects, is the provision of a revision mechanism.

Figure 22:
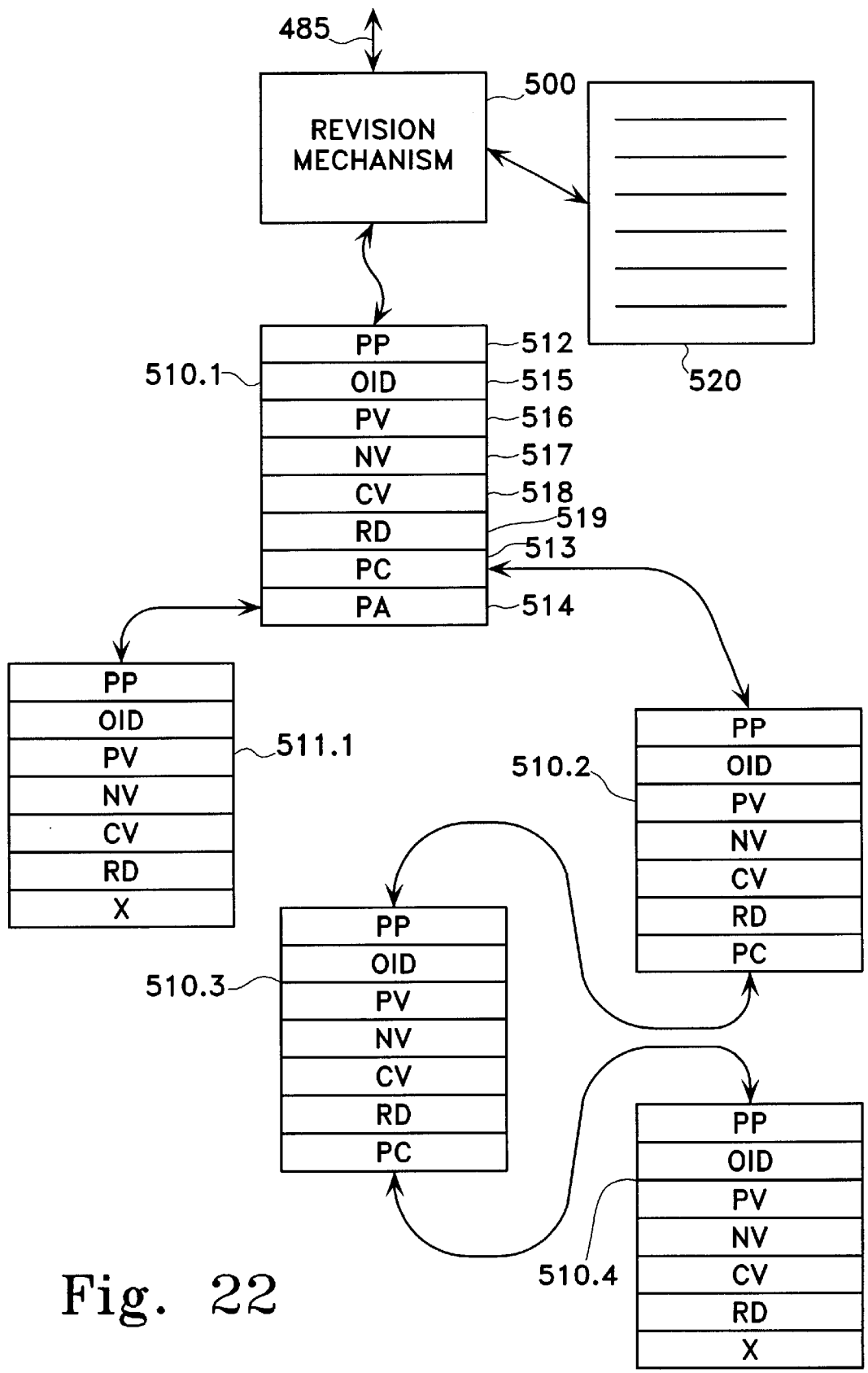
FIG. 22 is a schematic overview of a revision mechanism.

FIG. 22 is a schematic representation of a revision mechanism. The revision mechanism 500 can be responsive via the control mechanism 485 to any changes made to the model 160. Each change to the model is stored as a revision entry 510. Each revision entry is entered into an acyclic graph of revision entries 510.1, 511.1, 510.2, 510.3, 510.4, etc.

Each of those revision entries includes a pointer (PP) 512 to the previous entry, a pointer (PN) 513 to the next entry, and where appropriate one or more pointers (PF) 514 to an further entry for consequential revisions which result from the revision in question (e.g., for the entry 510.1, there is a main link to 510.2, but also a secondary link to 511.1). The entry also includes the object ID (OID) 515, the previous value (PV) 516 for a property, the new value (NV) 517 of the property after the revision, a current state (CV) indicator 518 for the revision (i.e. whether it is currently active or not), and details (RD) 519 of the revision concerned and the time the revision was made (possibly also by whom). It should be noted that rather than containing the previous value for a property, the revision entry could contain a definition of the modification effected by the revision. Also, distinct entries can be provided for the addition of new objects, as opposed to the modification of properties for existing objects.

A table of revisions 520 can be displayed on request by a user, with the table being derived from the graph. The user is able to select a desired revision from the list to remove that revision from the current state of the model, by deactivating the revision concerned and adjusting the current state indicator, or can reactivate, or reintroduce, a revision which is currently deactivated, as represented by the current state indicator 518 for the revision entry.

The revision hierarchy is persistent. Accordingly, it readily enables a particular state of the model to be reconstructed and selective deactivating and activating of individual revisions. As a result, it is possible readily to establish what was done when and how for individual revisions. As a result of the links in the hierarchy, any consequential changes are automatically accounted for.

Accordingly, there has been described a planning, or modeling system and method which provides a particularly flexible approach to the planning and modeling of systems with the automatic generation of output reports defining the results of the properties input to the planning process. The outputs of the planning system can be in the form of report so those result, but could also be used to generate direct output values for controlling processes in response to results as determined.

In a preferred embodiment of the invention the planning system is implemented by computer software operable on conventional computing hardware. The computer software could be supplied on a carrier medium such as optical, magnetic or other computer-readable storage medium. It could also be supplied over a telecommunications carrier medium such as a telephone or network communications medium, including electrical optical and electromagnetic (e.g., wireless) telecommunications medium. The computer software could be operable on a stand-alone workstation, or over a network (e.g. a local area network, a wide area network, an intranet or the Internet or indeed any other network) from a server station to a client station. The objects could be supplied on or from any of the media or locations mentioned above. It will be appreciated that although in the preferred embodiments, the invention is implemented using software operable on conventional computer hardware, it will be appreciated that it could be implemented, at least on part, by means of computer special purpose hardware, for example by means of application specific integrated circuits (ASICs).

Indeed, although particular embodiments of the invention have been described, it will be appreciated that many modifications and/or additions and/or substitutions may be made within the spirit and scope of the present invention as defined in the appended claims.

What is claimed is:

1. A computer-implemented modeling system, the modeling system comprising:
    a graphical user interface mechanism operable to display a timeframe on a computer display medium, wherein the timeframe comprises a timeline extending in a first direction and a plurality of spaced object lines extending in the same direction, the graphical user interface mechanism being further configured selectively to display, under user control, a representation of a selectable instance of at least one component object for a modeled entity, the representation of that component object instance as displayed with respect to the timeframe representing time-related properties for the component object instance;
    the at least one component object for a modeled entity, the component object comprising a calculating engine defining the functionality of the modeled entity, the calculating engine being configured to respond to the time-related properties for the selected component object instance to perform calculations on at least one component object property for deriving an output comprising a time-series of output values; and
    a result mechanism operable to derive at least one result value based on the time-series of output values derived by the selected component object instance.

2. The modeling system of claim 1, wherein the component object is configured to include a property in the form of at least one user definable link to another component object.

3. The modeling system of claim 1, wherein a plurality of user selectable object types are provided, each object type being for a respective modeling entity type and comprising a calculating engine defining a functionality specific to the respective modeling entity type.

4. The modeling system of claim 1, wherein the calculating engine of the component object is configured to perform calculations on at least one property of that component object.

5. The modeling system of claim 1, wherein the calculating engine of the component object is configured to perform calculations on at least one property of another component object.

6. The modeling system of claim 1, wherein the time-series of output values comprises at least one value associated with at least one calculation timing.

7. The modeling system of claim 1, wherein the display of the component object instance with respect to the timeframe represents at least an adjustable lifespan having a start time and an end time for the component object.

8. The modeling system of claim 7, wherein the display of the component object instance with respect to the timeframe further represents at least one calculation datum point corresponding to a calculation timing for an output value of the time-series of output values.

9. The modeling system of claim 8, wherein the calculating engine is responsive to changes in the positioning of the displayed instance of the component object to change the calculation timings for output values of the time-series of output values.

10. The modeling system of claim 1, wherein the timeline indicates time values.

11. The modeling system of claim 10, wherein the time values are dates.

12. The modeling system of claim 10, wherein the time values are duration offsets.

13. The modeling system of claim 1, wherein a said component object instance is defined in at least one object line.

14. The modeling system of claim 1, wherein the timeline extends in a row direction, and the object lines define separate rows parallel to the timeline.

15. The modeling system of claim 1, wherein an orthogonal correspondence between the extremities of a displayed component object instance along an object line with time values of the timeline represents a start time and an end time for the component object instance.

16. The modeling system of claim 1, configured to prevent overlapping of at least determined component object instances within an object line, whereby determined component object instances displayed within an object line have non-overlapping lifespans.

17. The modeling system of claim 1, configured to define parent-child relationships between component object instances displayed on respective object lines.

18. The modeling system of claim 1, wherein the displayed representation of the at least one component object instance is a bar.

19. The modeling system of claim 18, wherein at least one marker representing a calculation datum point corresponding to a calculation timing for an output value of the time-series of output values is superimposed on the bar.

20. The modeling system of claim 1, wherein the displayed representation of the at least one component object instance is a series of markers, the markers representing calculation datum points corresponding to calculation timings for respective output values of the time-series of output values, the markers being joined to represent the lifespan of the component object instance from a start time to an end time.

21. The modeling system of claim 1, wherein one component object instance is associated with a modeled entity, the component object instance performing a series of calculations for respective calculation timings for generating the time-series of output values.

22. The modeling system of claim 1, wherein a plurality of component object instances are associated with modeled entity, each component object instance performing a calculation for a determined calculation timing for generating one of the time-series of output values.

23. The modeling system of claim 1, wherein at least one component object instance includes a link to a further component object instance for defining a parent-child relationship.

24. The modeling system of claim 23, wherein a component object instance holds properties of a component object instance which is its child.

25. The modeling system of claim 23, wherein a component object instance is operable to obtain a property from a component object instance which is its parent.

26. The modeling system of claim 23, wherein a component object instance is responsive to a request for output from the result mechanism to obtain, from its parent object, properties for calculating an output comprising the time-series of output values, the output values being determined at datum points defined by the time-related properties for the component object.

27. The modeling system of claim 23, configured to define a root object with a user defined hierarchy of component objects being dependent therefrom for modeling at least one scenario.

28. The modeling system of claim 23, wherein relationships between component object instances are represented by displaying links between respective displayed component object instances.

29. The modeling system of claim 23, wherein the graphical user interface mechanism provides selective expansion, or contraction, of displayed sub-hierarchies of component object instances.

30. The modeling system of claim 1, wherein a displayed instance of a component object may be selectively enabled and disabled.

31. The modeling system of claim 30, wherein the selective enabling and disabling of a displayed instance of a component object causes enabling and disabling, respectively, of any component object which is a descendent thereof.

32. The modeling system of claim 1, wherein the representation displayed for an object reflects the state of that object, as to whether it is in an enabled, disabled, selected, error, or other state.

33. The modeling system of claim 1, wherein a model may be formed of a plurality of component models, each component model comprising one or more component objects.

34. The modeling system of claim 1, wherein at least one property comprises an array of values.

35. The modeling system of claim 1, wherein at least one property is sub-divided into sub-properties.

36. The modeling system of claim 1, wherein the graphical user interface is configured to display a plurality of icons corresponding to user selectable component object types, each component object type being for a respective modeling entity type and comprising a calculating engine defining a functionality specific to the respective modeling entity type, the icons being selectable by a user for positioning a representation of a component object instance with respect to the timeframe.

37. The modeling system of claim 1, wherein the graphical user interface is configured to display a data field for inputting properties of a component object.

38. The modeling system of claim 1, wherein the properties of a component object include at least one property selected from:
   a value;
   an array of values;
   a time-series of values;
   a state;
   a Boolean;
   a string;
   a timing;
   a duration;
   a link;
   a bit map; and
   a binary stream.

39. The modeling system of claim 1 wherein the result mechanism comprises at least one result object for generating a report including at least output value based on at least one time-series of output values derived by at least one component object instance.

40. The modeling system of claim 39, wherein the report is displayable.

41. The modeling system of claim 39, wherein the report is printed on a printer.

42. The modeling system of claim 39, wherein the report is a financial report.

43. The modeling system of claim 39, wherein the result mechanism provides at least one control value for controlling the operation of a modeled system.

44. The modeling system of claim 1, further comprising a mechanism to model alternative scenarios, wherein the at least one component object records respective properties for plural scenarios.

45. The modeling system of claim 1, further comprising a revision mechanism operable to record revisions of the model of a scenario, the revision mechanism being operable to define a hierarchy of revision entries.

46. The modeling system of claim 45, wherein a revision entry defines a previous value of a property and a current value of a property.

47. The modeling system of claim 46, wherein the revision mechanism is configured to be responsive to selection of a revision of a model, to access a linked series of revision entries selectively to remove and to reintroduce the selected revision for the current version of the model.

48. A computer system comprising a processor, storage, a display device, at least one user input device and a program-implemented modeling tool, the modeling tool comprising:

a graphical user interface mechanism operable to display a timeframe on a computer display medium, wherein the timeframe comprises a timeline extending in a first direction and a plurality of spaced object lines extending in the same direction, the graphical user interface mechanism being further configured selectively to display, under user control, a representation of a selectable instance of at least one component object for a modeled entity, the representation of that component object instance as displayed with respect to the timeframe representing time-related properties for the component object instance;

the at least one component object for a modeled entity, the component object comprising a calculating engine defining the functionality of the modeled entity, the calculating engine being configured to respond to the time-related properties for the selected component object instance to perform calculations on at least one component object property for deriving an output comprising a time-series of output values; and a result mechanism operable to derive at least one result value based on the time-series of output values derived by the selected component object instance.

49. A computer program product carried by a carrier medium, the computer program product comprising:

graphical user interface instructions operable to display a timeframe on a computer display medium, wherein the timeframe comprises a timeline extending in a first direction and a plurality of spaced object lines extending in the same direction, the graphical user interface instructions being further configured selectively to display, under user control, a representation of a selectable instance of at least one component object for a modeled entity, the representation of that component object instance as displayed with respect to the timeframe representing time-related properties for the component object instance;

component object definition instructions operable to define the at least one component object for a modeled entity, the component object comprising a calculating engine defining the functionality of the modeled entity, the calculating engine being configured to respond to the time-related properties for the selected component object instance to perform calculations on at least one component object property for deriving an output comprising a time-series of output values; and result generation instructions operable to derive at least one result value based on the time-series of output values derived by the selected component object instance.

50. The computer program product of claim 49, wherein the carrier medium is a computer readable storage medium.

51. The computer program product of claim 49, wherein the carrier medium is a telecommunications carrier medium.

52. A computer-implemented modeling method, the method comprising:

displaying a timeframe on a computer display medium wherein the timeframe comprises a timeline extending in a first direction and a plurality of spaced object lines extending in the same direction;

displaying, under user control, a representation of a selectable instance of at least one component object for a modeled entity, the representation of that component object instance as displayed with respect to the timeframe representing time-related properties for the component object instance;

causing the component object to be responsive to the time-related properties for the component object instance to perform calculations for the modeled entity on component object properties for deriving an output comprising a time-series of output values; and producing at least one result value based on the time-series of output values derived by at least one component object.

53. The method of claim 52, wherein the component object is configured to include a property in the form of at least one user definable link to another component object.

54. The method of claim 52, further comprising displaying a plurality of user selectable object types, each object type being for respective modeling entity type and defining a functionality specific to the respective modeling entity type.

55. The method of claim 52, comprising positioning the component object instance with respect to the timeframe so as to define at least an adjustable lifespan having a start time and an end time for the component object.

56. The method of claim 52, comprising displaying at least one marker at a position for defining a calculation datum point corresponding to a calculation timing for an output value of the time-series of output values.

57. The method of claim 52, wherein a said component object instance is defined in at least one object line.

58. The method of claim 57, comprising the user specifying a lifespan for a component object by aligning the component object instance on an object line with extremities of the instance of the component object aligned with points on the timeline corresponding to the start time and end time for the component object.

59. The method of claim 57, comprising displaying at least one marker at a position for defining a calculation datum point corresponding to a calculation timing for an output value of the time-series of output values, the method further including modifying the position of the marker for adjusting the calculation timing for the output value.

60. The method of claim 57, wherein the time-series of output values is dynamically varied in response to adjustments of the positioning of the component object instance with respect to the timeline.

61. The method of claim 57, wherein the movement of at least one extremity of an instance of an object on an object line to a position occupied by an instance of another object on the object line causes the instance of the other object to be moved to avoid overlapping of adjacent instances of objects on an object line.

62. The method of claim 57, comprising the derivation, under user control, of at least one parent-child relationship between instances of objects on respective object lines, the method comprising the automatic display of a representation of the parent-child relationship and the modification of the component objects to reflect the parent child relationship.

63. The method of claim 62, further comprising a component object responding to a request for output from the result mechanism to obtain, from its parent object, an account for calculating an output comprising the time-series of output values, the output values being determined at datum points defined by the time-related properties for the component object.

64. The method of claim 52, comprising displaying a plurality of predefined object types for selection by a user for positioning with respect to the timeframe.

65. The method of claim 52, comprising displaying an input field for receiving input by a user of properties for a component object.

66. The method of claim 52, comprising generating a report including at least one value derived from at least one time-series of output values.

67. The method of claim 66, comprising displaying the report.

68. The method of claim 66, comprising printing the report.

69. The method of claim 66, comprising exporting the report.

70. The method of claim 66, wherein the report is a financial report.

71. The method of claim 66, comprising outputting at least one control value to a modeled system for controlling the operation of the modeled system.

72. The method of claim 52, comprising the modeling alternative scenarios, the method including recording respective properties for plural scenarios in at least one component object.

73. The method of claim 52, further comprising maintaining a revision record of revisions of the model of a scenario, the revision record including an acyclic graph of revision entries.

74. The method of claim 73, wherein each revision entry includes a revision step for a property of a component object.

75. The method of claim 74, comprising accessing the linked series of revision entries to cause a revision to be deactivated or reactivated for the current model.

76. A computer-implemented modeling system, the modeling system comprising:

a graphical user interface mechanism configured to display a timeframe on a computer display medium, the graphical user interface mechanism being further configured selectively to display, under user control, a representation of a selectable instance of at least one component object for a modeled entity, the representation of that component object instance as displayed with respect to the timeframe representing time-related properties for the component object instance;

the at least one component object for a modeled entity, the component object comprising a calculating engine defining the functionality of the modeled entity, the calculating engine being configured to respond to the time-related properties for the selected component object instance to perform calculations on at least one component object property for deriving an output comprising a time-series of output values; and a result mechanism for deriving at least one result value based on the time-series of output values derived by the selected component object instance, wherein at least one component object instance includes a link to a further component object instance for defining a parent-child relationship, relationships between component object instances being represented by displaying links between respective displayed component object instances.

77. A computer-implemented modeling system, the modeling system comprising:

a graphical user interface mechanism configured to display a timeframe on a computer display medium, the graphical user interface mechanism being further configured selectively to display, under user control, a representation of a selectable instance of at least one component object for a modeled entity, the representation of that component object instance as displayed with respect to the timeframe representing time-related properties for the component object instance;

the at least one component object for a modeled entity, the component object comprising a calculating engine defining the functionality of the modeled entity, the calculating engine being configured to respond to the time-related properties for the selected component object instance to perform calculations on at least one component object property for deriving an output comprising a time-series of output values; and a result mechanism for deriving at least one result value based on the time-series of output values derived by the selected component object instance;

wherein at least one component object instance includes a link to a further component object instance for defining a parent-child relationship, the graphical user interface mechanism providing selective expansion, or contraction, of displayed sub-hierarchies of component object instances.

78. A computer-implemented modeling system, the modeling system comprising:

a graphical user interface mechanism configured to display a timeframe on a computer display medium, the graphical user interface mechanism being further configured selectively to display, under user control, a representation of a selectable instance of at least one component object for a modeled entity, the representation of that component object instance as displayed with respect to the timeframe representing time-related properties for the component object instance;

the at least one component object for a modeled entity, the component object comprising a calculating engine defining the functionality of the modeled entity, the calculating engine being configured to respond to the time-related properties for the selected component object instance to perform calculations on at least one component object property for deriving an output comprising a time-series of output values; and a result mechanism for deriving at least one result value based on the time-series of output values derived by the selected component object instance;

wherein a displayed instance of a component object may be selectively enabled and disabled.

79. A computer-implemented modeling system, the modeling system comprising:

a graphical user interface mechanism configured to display a timeframe on a computer display medium, the graphical user interface mechanism being further configured selectively to display, under user control, a representation of a selectable instance of at least one component object for a modeled entity, the representation of that component object instance as displayed with respect to the timeframe representing time-related properties for the component object instance;

the at least one component object for a modeled entity, the component object comprising a calculating engine defining the functionality of the modeled entity, the calculating engine being configured to respond to the time-related properties for the selected component object instance to perform calculations on at least one component object property for deriving an output comprising a time-series of output values; and a result mechanism for deriving at least one result value based on the time-series of output values derived by the selected component object instance;

wherein the graphical user interface is configured to display a plurality of icons corresponding to user selectable component object types, each component object type being for a respective modeling entity type and comprising a calculating engine defining a functionality specific to the respective modeling entity type, the icons being selectable by a user for positioning a representation of a component object instance with respect to the timeframe.

80. A computer-implemented modeling system, the modeling system comprising:

a graphical user interface mechanism configured to display a timeframe on a computer display medium, the graphical user interface mechanism being further configured selectively to display, under user control, a representation of a selectable instance of at least one component object for a modeled entity, the representation of that component object instance as displayed with respect to the timeframe representing time-related properties for the component object instance;

the at least one component object for a modeled entity, the component object comprising a calculating engine defining the functionality of the modeled entity, the calculating engine being configured to respond to the time-related properties for the selected component object instance to perform calculations on at least one component object property for deriving an output comprising a time-series of output values; and a result mechanism for deriving at least one result value based on the time-series of output values derived by the selected component object instance;

wherein the result mechanism comprises at least one result object for generating a report including at least output value based on at least one time-series of output values derived by at least one component object instance, the result mechanism providing at least one control value for controlling the operation of a modeled system.

81. A computer-implemented modeling system, the modeling system comprising:

a graphical user interface mechanism configured to display a timeframe on a computer display medium, the graphical user interface mechanism being further configured selectively to display, under user control, a representation of a selectable instance of at least one component object for a modeled entity, the representation of that component object instance as displayed with respect to the timeframe representing time-related properties for the component object instance;

the at least one component object for a modeled entity, the component object comprising a calculating engine defining the functionality of the modeled entity, the calculating engine being configured to respond to the time-related properties for the selected component object instance to perform calculations on at least one component object property for deriving an output comprising a time-series of output values; and a result mechanism for deriving at least one result value based on the time-series of output values derived by the selected component object instance;

wherein the system is operable to model alternative scenarios, the at least one component object recording respective properties for plural scenarios.

82. A computer-implemented modeling system, the modeling system comprising:

a graphical user interface mechanism configured to display a timeframe on a computer display medium, the graphical user interface mechanism being further configured selectively to display, under user control, a representation of a selectable instance of at least one component object for a modeled entity, the representation of that component object instance as displayed with respect to the timeframe representing time-related properties for the component object instance;

the at least one component object for a modeled entity, the component object comprising a calculating engine defining the functionality of the modeled entity, the calculating engine being configured to respond to the time-related properties for the selected component object instance to perform calculations on at least one component object property for deriving an output comprising a time-series of output values;

a result mechanism for deriving at least one result value based on the time-series of output values derived by the selected component object instance; and a revision mechanism operable to record revisions of the model of a scenario, the revision mechanism being operable to define a hierarchy of revision entries.

83. A computer-implemented modeling method, the method comprising:

displaying a timeframe on a computer display medium wherein the timeframe comprises a timeline extending in a first direction and a plurality of spaced object lines parallel to the timeline;

displaying, under user control, a representation of a selectable instance of at least one component object for a modeled entity, the representation of that component object instance as displayed with respect to the timeframe representing time-related properties for the component object instance;

causing the component object to be responsive to the time-related properties for the component object instance to perform calculations for the modeled entity on component object properties for deriving an output comprising a time-series of output values; and producing at least one result value based on the time-series of output values derived by at least one component object;

wherein the method further comprises the derivation, under user control, of at least one parent-child relationship between instances of objects on respective object lines, the method comprising the automatic display of a representation of the parent-child relationship and the modification of the component objects to reflect the parent child relationship.

84. A computer-implemented modeling method, the method comprising:

displaying a timeframe on a computer display medium wherein the timeframe comprises a timeline extending in a first direction and a plurality of spaced object lines parallel to the timeline;

displaying, under user control, a representation of a selectable instance of at least one component object for a modeled entity, the representation of that component object instance as displayed with respect to the timeframe representing time-related properties for the component object instance;

causing the component object to be responsive to the time-related properties for the component object instance to perform calculations for the modeled entity on component object properties for deriving an output comprising a time-series of output values;

producing at least one result value based on the time-series of output values derived by at least one component object;

generating a report including at least one value derived from at least one time-series of output values; and outputting at least one control value to a modeled system for controlling the operation of the modeled system.

85. A computer-implemented modeling method, the method comprising:

displaying a timeframe on a computer display medium wherein the timeframe comprises a timeline extending in a first direction and a plurality of spaced object lines parallel to the timeline;

displaying, under user control, a representation of a selectable instance of at least one component object for a modeled entity, the representation of that component object instance as displayed with respect to the timeframe representing time-related properties for the component object instance;

causing the component object to be responsive to the time-related properties for the component object instance to perform calculations for the modeled entity on component object properties for deriving an output comprising a time-series of output values;

producing at least one result value based on the time-series of output values derived by at least one component object;

the method further comprising modeling alternative scenarios, the method including recording respective properties for plural scenarios in at least one component object.

86. A computer-implemented modeling method, the method comprising:

displaying a timeframe on a computer display medium wherein the timeframe comprises a timeline extending in a first direction and a plurality of spaced object lines parallel to the timeline;

displaying, under user control, a representation of a selectable instance of at least one component object for a modeled entity, the representation of that component object instance as displayed with respect to the timeframe representing time-related properties for the component object instance;

causing the component object to be responsive to the time-related properties for the component object instance to perform calculations for the modeled entity on component object properties for deriving an output comprising a time-series of output values;

producing at least one result value based on the time-series of output values derived by at least one component object;

the method further comprising maintaining a revision record of revisions of the model of a scenario, the revision record including an acyclic graph of revision entries.

87. A computer-implemented modeling system, the modeling system comprising:

graphical user interface means for displaying a timeframe on computer display means, wherein the timeframe comprises a timeline extending in a first direction and a plurality of spaced object lines parallel to the timeline, the graphical user interface means selectively displaying, under user control, a representation of a selectable instance of at least one component object for a modeled entity, the representation of that component object instance as displayed with respect to the timeframe representing time-related properties for the component object instance;

the at least one component object for a modeled entity, the component object comprising a calculating means for defining the functionality of the modeled entity, the calculating means responding to the time-related properties for the selected component object instance for performing calculations on at least one component object property for deriving an output comprising a time-series of output values; and a result means for deriving at least one result value based on the time-series of output values derived by the selected component object instance.

* * * * *

UNITED STATES PATENT AND TRADEMARK OFFICE
CERTIFICATE OF CORRECTION

PATENT NO. : 6,360,188 B1
DATED : March 19, 2002
INVENTOR(S) : Friedman et al.

It is certified that error appears in the above-identified patent and that said Letters Patent is hereby corrected as shown below:

<u>Title page,</u>
Item [75], please delete the inventor's name, "Freidman" and replace with
-- Friedman --.

Signed and Sealed this

Fourth Day of June, 2002

Attest:

JAMES E. ROGAN
Attesting Officer
*Director of the United States Patent and Trademark Office*